US012637981B2

(12) United States Patent
Oehrle et al.

(10) Patent No.: US 12,637,981 B2
(45) Date of Patent: *May 26, 2026

(54) GAS TURBINE ENGINE

(71) Applicant: General Electric Company, Evendale, OH (US)

(72) Inventors: Daniel John Oehrle, West Chester, OH (US); Randy M. Vondrell, Newport, KY (US); Apolinario Barra Ruiz, Querétaro (MX)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,679

(22) Filed: Feb. 26, 2025

(65) Prior Publication Data

US 2025/0198347 A1 Jun. 19, 2025

Related U.S. Application Data

(63) Continuation-in-part of application No. 18/824,100, filed on Sep. 4, 2024, which is a continuation of
(Continued)

(51) Int. Cl.
*F02C 7/32* (2006.01)
*B64D 27/12* (2006.01)

(52) U.S. Cl.
CPC ................ *F02C 7/32* (2013.01); *B64D 27/12* (2013.01)

(58) Field of Classification Search
None
See application file for complete search history.

(56) References Cited

U.S. PATENT DOCUMENTS 2,582,842 A    1/1952   Messinger
3,651,645 A    3/1972   Grieb
(Continued)

FOREIGN PATENT DOCUMENTS

GB    2136880 A    9/1984
GB    2204361 A    11/1988
(Continued)

OTHER PUBLICATIONS

Air transportation safety investigation A14Q0068, Bombardier Inc., Transportation Safety Board of Canada, May 29, 2014, 54 Pages.
(Continued)

*Primary Examiner* — David P. Olynick
(74) *Attorney, Agent, or Firm* — Dority & Manning, P.A.

(57) ABSTRACT

A gas turbine engine defines an axial direction and a radial direction and comprises a turbomachine having an unducted primary fan, a core engine a combustor casing enclosing a combustor and defining an outer surface, a core cowl surrounding at least a portion of the core engine. The outer surface of the core cowl defines a peak cowl diameter in the radial direction, and the outer surface of the combustor casing defines a maximum combustor casing diameter along the radial direction. The core engine defines an overall core axial length along the axial direction and an under-core cowl axial length along the axial direction. The gas turbine engine defines a core cowl diameter ratio equal to the peak cowl diameter divided by the maximum combustor casing diameter and a core cowl length ratio equal to the under-core cowl axial length divided by the overall core axial length.

20 Claims, 23 Drawing Sheets

Related U.S. Application Data application No. 17/972,720, filed on Oct. 25, 2022, now Pat. No. 12,104,539.

(56) References Cited

U.S. PATENT DOCUMENTS

| | | | |
|---|---|---|---|
| 4,078,604 | A | 3/1978 | Christl et al. |
| 4,505,124 | A | 3/1985 | Mayer |
| 4,550,573 | A | 11/1985 | Rannenberg |
| 4,773,212 | A | 9/1988 | Griffin et al. |
| 5,297,386 | A | 3/1994 | Kervistin |
| 5,317,877 | A | 6/1994 | Stuart |
| 5,619,855 | A | 4/1997 | Burrus |
| 5,667,168 | A | 9/1997 | Fluegel |
| 5,680,767 | A | 10/1997 | Lee et al. |
| 5,724,816 | A | 3/1998 | Ritter et al. |
| 5,782,076 | A | 7/1998 | Huber et al. |
| 5,802,841 | A | 9/1998 | Maeda |
| 5,819,525 | A | 10/1998 | Gaul et al. |
| 6,182,435 | B1 | 2/2001 | Niggemann et al. |
| 6,250,097 | B1 | 6/2001 | Lui et al. |
| 6,415,595 | B1 | 7/2002 | Wilmot, Jr. et al. |
| 6,578,362 | B1 | 6/2003 | Coffinberry |
| 6,584,778 | B1 | 7/2003 | Griffiths et al. |
| 6,701,717 | B2 | 3/2004 | Flatman et al. |
| 6,939,392 | B2 | 9/2005 | Huang et al. |
| 6,943,699 | B2 | 9/2005 | Ziarno |
| 7,010,906 | B2 | 3/2006 | Cazenave et al. |
| 7,059,136 | B2 | 6/2006 | Coffinberry |
| 7,260,926 | B2 | 8/2007 | Sabatino et al. |
| 7,377,098 | B2 | 5/2008 | Walker et al. |
| 7,398,641 | B2 | 7/2008 | Stretton et al. |
| 7,406,829 | B2 | 8/2008 | Coffinberry |
| 7,882,704 | B2 | 2/2011 | Chen |
| 8,261,528 | B2 | 9/2012 | Chillar et al. |
| 8,499,822 | B2 | 8/2013 | Bulin et al. |
| 8,522,572 | B2 | 9/2013 | Coffinberry et al. |
| 8,607,578 | B2 | 12/2013 | Fert |
| 8,789,376 | B2 | 7/2014 | Coffinberry |
| 8,922,330 | B2 | 12/2014 | Moberg et al. |
| 8,943,827 | B2 | 2/2015 | Prociw et al. |
| 8,944,367 | B2 | 2/2015 | Bystry, Jr. et al. |
| 8,961,114 | B2 | 2/2015 | Ruthemeyer |
| 8,984,884 | B2 | 3/2015 | Xu et al. |
| 9,038,397 | B2 | 5/2015 | Papa et al. |
| 9,109,842 | B2 | 8/2015 | Prociw et al. |
| 9,259,808 | B2 | 2/2016 | Broughton et al. |
| 9,354,621 | B2 | 5/2016 | Westervelt et al. |
| 9,562,828 | B2 | 2/2017 | Broughton |
| 9,611,047 | B2 | 4/2017 | Kohn et al. |
| 9,677,501 | B2 | 6/2017 | Pierluissi et al. |
| 9,788,447 | B2 | 10/2017 | Dalton |
| 9,810,158 | B2 | 11/2017 | Foutch et al. |
| 9,845,768 | B2 | 12/2017 | Pesyna et al. |
| 9,863,366 | B2 | 1/2018 | Froemming et al. |
| 10,167,814 | B2 | 1/2019 | Ferrier et al. |
| 10,190,506 | B2 | 1/2019 | Ruberte Sanchez |
| 10,264,688 | B2 | 4/2019 | Richardson et al. |
| 10,787,996 | B2 | 9/2020 | Kupratis et al. |
| 11,066,179 | B2 | 7/2021 | Ramlaoui et al. |
| 11,174,789 | B2 | 11/2021 | Rambo et al. |
| 2009/0188234 | A1 | 7/2009 | Suciu et al. |
| 2012/0000205 | A1 | 1/2012 | Coffinberry et al. |
| 2012/0297789 | A1 | 11/2012 | Coffinberry |
| 2013/0055724 | A1 | 3/2013 | Finney et al. |
| 2013/0186100 | A1 | 7/2013 | Rhoden et al. |
| 2014/0023945 | A1 | 1/2014 | Epstein et al. |
| 2014/0205446 | A1 | 7/2014 | Patsouris et al. |
| 2014/0345292 | A1 | 11/2014 | Diaz et al. |
| 2015/0000291 | A1 | 1/2015 | Smith et al. |
| 2016/0108819 | A1 | 4/2016 | Dreher et al. |
| 2016/0131036 | A1 | 5/2016 | Bintz et al. |
| 2017/0022900 | A1 | 1/2017 | Miller et al. |
| 2017/0023018 | A1 | 1/2017 | Miller et al. |
| 2017/0030266 | A1 | 2/2017 | Cerny et al. |
| 2017/0114721 | A1 | 4/2017 | Miller et al. |
| 2017/0167382 | A1 | 6/2017 | Miller et al. |
| 2017/0204787 | A1 | 7/2017 | Duesler et al. |
| 2021/0301827 | A1 | 9/2021 | Stretton et al. |
| 2021/0310417 | A1 | 10/2021 | Hrubec et al. |
| 2022/0049911 | A1 | 2/2022 | Djelassi et al. |
| 2022/0055760 | A1 | 2/2022 | Schmitter et al. |

FOREIGN PATENT DOCUMENTS

| | | |
|---|---|---|
| JP | S5932893 U | 2/1984 |
| WO | WO2011/038188 A1 | 3/2011 |
| WO | WO2014/105327 A1 | 7/2014 |

OTHER PUBLICATIONS

Analysis: the PW1100 GTF Engine and the Airbus A320NEO, Sahifa, Bangalore Aviation, Jan. 20, 2017, 9 Pages. Retrieved from: https://www.bangaloreaviation.com/2017/01/analysis-pw1100-gtf-engine-airbus-a320neo.html.

Atsushi et al., Development of PW1100G-JM Turbofan Engine, IHI Engineering Review, vol. 47, No. 1, 2014, 6 Pages.

Aviation Investigation—4 Docket Items—ENG19IA029, NTSB National Transportation Safety Board, Jan. 13, 2021, 85 Pages. Retrieved from: https://data.ntsb.gov/Docket/?NTSBNumber=ENG19IA029#.

Dorsey et al., Design Space Exploration of Future Open Rotor Configurations, AIAA 2020-3680, Cycle Performance and MDAO, 2020. (Abstract Only) Retrieved from: https://arc.aiaa.org/doi/10.2514/6.2020-3680.

"E00063EN", General Electric Company, U.S. Department of Transportation, Federal Aviation Administration Type Certification Data Sheet, Revision 8, Nov. 22, 2016, 12 Pages.

"E00070EN", General Electric Company, U.S. Department of Transportation, Federal Aviation Administration Type Certification Data Sheet, Revision 13, Jul. 14, 2021, 10 Pages.

"E00076EN", General Electric Company, U.S. Department of Transportation, Federal Aviation Administration Type Certification Data Sheet, Revision 21, Aug. 19, 2021, 22 Pages.

"E00087EN", General Electric Company, U.S. Department of Transportation, Federal Aviation Administration Type Certification Data Sheet, Revision 6, May 6, 2019, 9 Pages.

"E00088EN", General Electric Company, U.S. Department of Transportation, Federal Aviation Administration Type Certification Data Sheet, Revision 5, Nov. 4, 20191, 11 Pages.

"E00089EN", General Electric Company, U.S. Department of Transportation, Federal Aviation Administration Type Certification Data Sheet, Revision 7, Feb. 7, 2019, 17 Pages.

"E00090EN", General Electric Company, U.S. Department of Transportation, Federal Aviation Administration Type Certification Data Sheet, Revision 10, Jun. 2, 2022, 8 Pages.

"E00091EN", General Electric Company, U.S. Department of Transportation, Federal Aviation Administration Type Certification Data Sheet, Revision 2, Mar. 18, 2019, 9 Pages.

"E00095EN", General Electric Company, U.S. Department of Transportation, Federal Aviation Administration Type Certification Data Sheet, Revision 2, Apr. 2, 2021, 9 Pages.

Gliebe et al., Ultra-High Bypass Engine Aeroacoustic Study, NASA/CR-2003-212525, NASA, 2003, 109 pages.

Halliwell et al., Fuel Burn Benefits of a Variable-Pitch Geared Fan Engine, AIAA 2012-3912, 48th AIAA/ASME/SAE/ASEE Joint Propulsion Conference & Exhibit, Atlanta, GA. (Abstract Only) Retrieved from: https://arc.aiaa.org/doi/10.2514/6.2012-3912.

Jackson, Optimisation of Aero and Industrial Gas Turbine Design for the Environment, Thesis Cranfield University, 2009. (Abstract Only) Retrieved from http://hdl.handle.net/1826/4316.

Pratt and Whitney, PW1100G Geared Turbofan Engine, The Flying Engineer, Technically and Operationally Commercial Aviation, Nov. 26, 2013, 24 Pages. Retrieved from: https://theflyingengineer.com/flightdeck/pw1100g-gtf/.

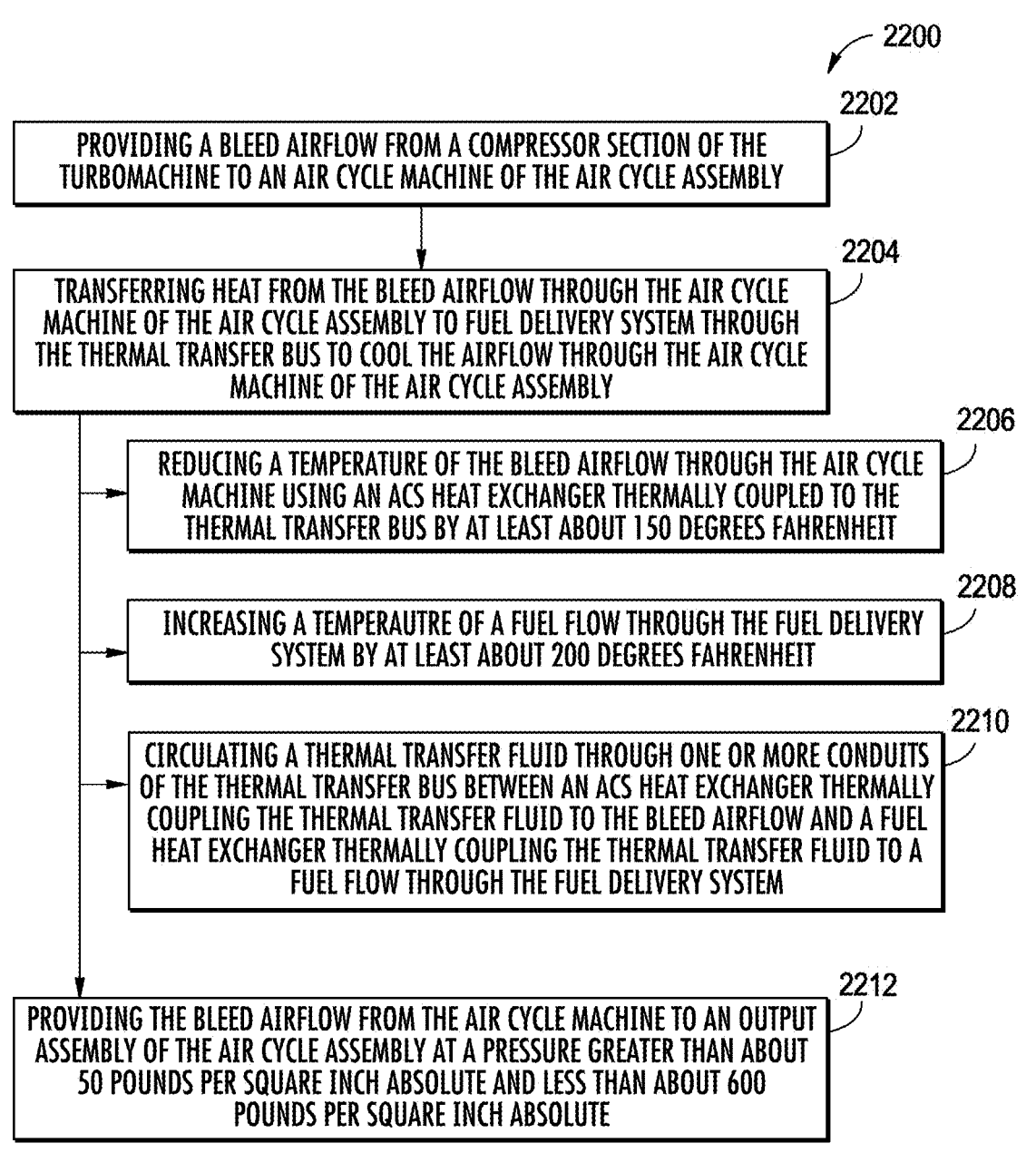

2200

2202

PROVIDING A BLEED AIRFLOW FROM A COMPRESSOR SECTION OF THE TURBOMACHINE TO AN AIR CYCLE MACHINE OF THE AIR CYCLE ASSEMBLY

2204

TRANSFERRING HEAT FROM THE BLEED AIRFLOW THROUGH THE AIR CYCLE MACHINE OF THE AIR CYCLE ASSEMBLY TO FUEL DELIVERY SYSTEM THROUGH THE THERMAL TRANSFER BUS TO COOL THE AIRFLOW THROUGH THE AIR CYCLE MACHINE OF THE AIR CYCLE ASSEMBLY

2206

REDUCING A TEMPERATURE OF THE BLEED AIRFLOW THROUGH THE AIR CYCLE MACHINE USING AN ACS HEAT EXCHANGER THERMALLY COUPLED TO THE THERMAL TRANSFER BUS BY AT LEAST ABOUT 150 DEGREES FAHRENHEIT

2208

INCREASING A TEMPERAUTRE OF A FUEL FLOW THROUGH THE FUEL DELIVERY SYSTEM BY AT LEAST ABOUT 200 DEGREES FAHRENHEIT

2210

CIRCULATING A THERMAL TRANSFER FLUID THROUGH ONE OR MORE CONDUITS OF THE THERMAL TRANSFER BUS BETWEEN AN ACS HEAT EXCHANGER THERMALLY COUPLING THE THERMAL TRANSFER FLUID TO THE BLEED AIRFLOW AND A FUEL HEAT EXCHANGER THERMALLY COUPLING THE THERMAL TRANSFER FLUID TO A FUEL FLOW THROUGH THE FUEL DELIVERY SYSTEM

2212

PROVIDING THE BLEED AIRFLOW FROM THE AIR CYCLE MACHINE TO AN OUTPUT ASSEMBLY OF THE AIR CYCLE ASSEMBLY AT A PRESSURE GREATER THAN ABOUT 50 POUNDS PER SQUARE INCH ABSOLUTE AND LESS THAN ABOUT 600 POUNDS PER SQUARE INCH ABSOLUTE

FIG. 25

GAS TURBINE ENGINE

CROSS-REFERENCE TO RELATED APPLICATIONS

This application is a continuation-in-part of U.S. application Ser. No. 18/824,100, filed Sep. 4, 2024, which is a continuation application of U.S. application Ser. No. 17/972,720 (now U.S. Pat. No. 12,104,539), filed Oct. 25, 2022, each of which is hereby incorporated by reference in its entireties.

FIELD

The present disclosure relates to a gas turbine engine, such as an aeronautical gas turbine engine.

BACKGROUND

A gas turbine engine generally includes a turbomachine. The turbomachine includes several engine accessories such as controllers, pumps, heat exchangers and the like that are necessary for operation. These engine accessories and engine systems may be mounted to the turbomachine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 25 is a method for operating a gas turbine engine assembly in accordance with an exemplary aspect of the present disclosure.

DETAILED DESCRIPTION

Figure 1:
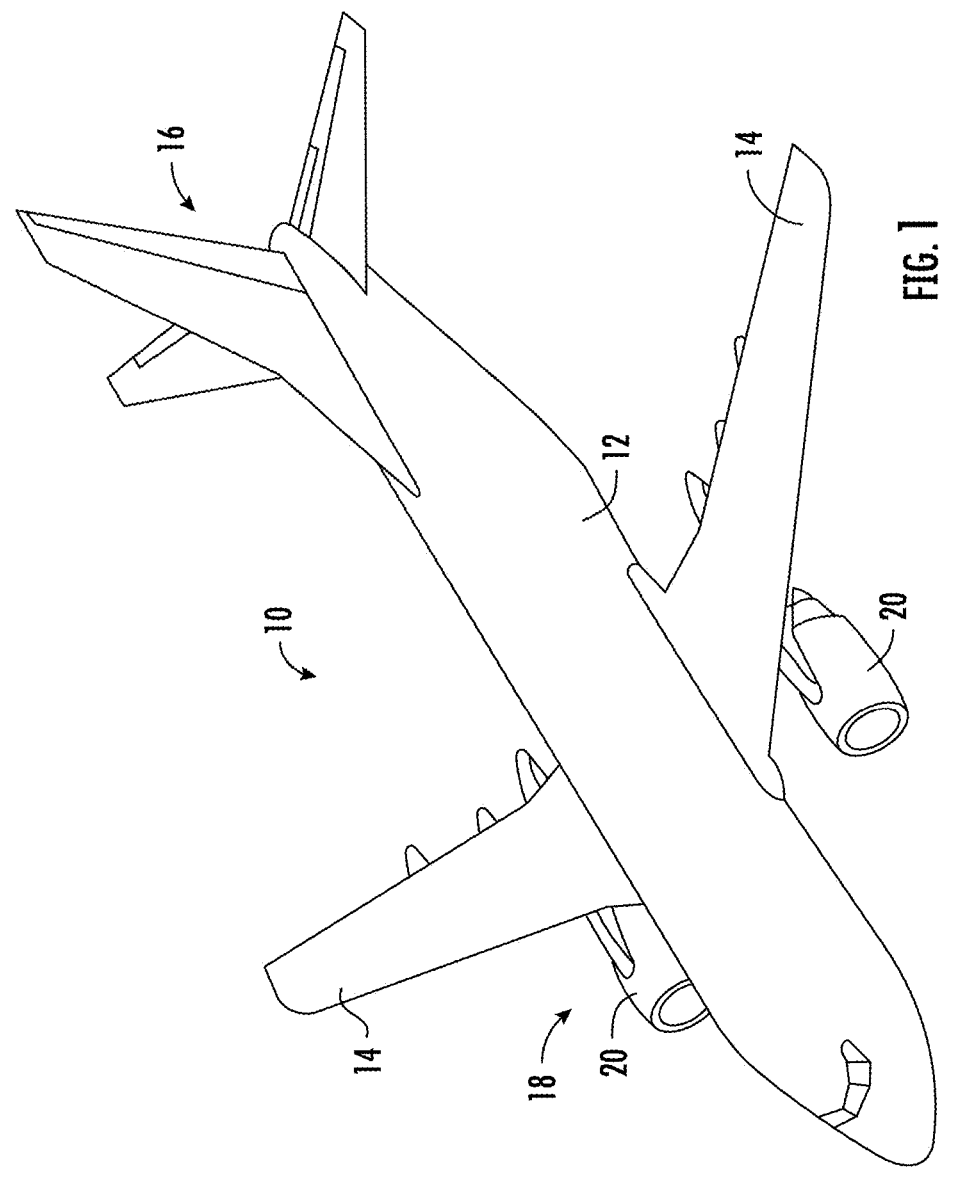
FIG. 1 is perspective view of an exemplary aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or aircraft and refer to the normal operational attitude of the gas turbine engine or aircraft. For example, with regards to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "cowl" includes a housing, casing, or other structure that at least partially encases or surrounds a portion of a turbomachine or gas turbine engine.

The phrases "from X to Y" and "between X and Y" each refers to a range of values inclusive of the endpoints (i.e., refers to a range of values that includes both X and Y).

The term "propulsive efficiency" refers to an efficiency with which the energy contained in an engine's fuel is converted into kinetic energy for the vehicle incorporating the engine, to accelerate it, or to replace losses due to aerodynamic drag or gravity.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, at a static flight speed, and/or at 86 degree Fahrenheit ambient temperature operating conditions.

Furthermore in certain exemplary embodiments, aspects of the airflow through the third stream (e.g., airstream, mixing, or exhaust properties), and the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Conventional turbofan engine design practice has been to provide an outer nacelle surrounding the fan to provide relatively efficient thrust for the turbofan engine at high fan speeds (compared with an unducted fan). Such a configuration may generally limit a permissible size of the fan (i.e., a diameter of the fan). Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. The inventors of the present disclosure seek to drive the fan diameter higher, to reduce fan pressure ratio while maintaining the same level of thrust to improve fuel efficiency. By increasing the fan diameter, however, an installation of the turbofan engine becomes more difficult. In addition, if an outer nacelle is maintained, the outer nacelle may become weight prohibitive with some larger diameter fans.

The inventors of the present disclosure found that for a three-stream gas turbine engine having an unducted primary fan (the outer nacelle removed) and a ducted secondary fan, with the secondary fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiency for the gas turbine engine, or unexpectedly, may in fact increase the overall propulsive efficiency of the gas turbine engine. Further, by including a third stream, an axial length of the core engine may be reduced relative to the overall engine axial length by allowing for a portion of the airflow through the engine to flow through the third stream. This reduces an overall weight of the engine. However, the core engine must maintain a sufficient size to produce enough power to drive the primary fan and the ducted secondary fan.

Further, removing the outer nacelle and reducing the overall axial length of the core engine significantly reduces engine accessory storage space. A diameter of a core cowl may be increased to make room for the accessories between an engine casing and an inner surface of the core cowl, however, the core cowl diameter cannot be too large due to potential performance penalties such as excessive drag and installation difficulties. Additionally, arranging additional components under the core cowl exposes those components to heat from the engine, which can degrade component stability and/or performance.

The inventors proceeded in the manner of designing a gas turbine engine with a given core cowl diameter, core diameter, core axial length, and overall engine axial length; checking the propulsive efficiency of the designed gas turbine engine; redesigning the gas turbine engine with varying core cowl diameters, core diameters, core axial lengths, and overall engine axial lengths; rechecking the propulsive efficiency of the redesigned gas turbine engine; and then making accommodations when, for example, it was found that subsystem sizes increased due to certification requirements and/or power requirements, or servicing needs impacted where to locate things during the design of several different types of gas turbine engines, including the gas turbine engine described below with reference to, e.g., FIGS. 4 through 8.

During the course of this practice of studying and evaluating various cowl diameters, core diameters, core length, and engine length considered feasible for best satisfying mission requirements, it was discovered that certain relationships exist between a core cowl diameter ratio (which is equal to a peak cowl diameter divided by a maximum combustor casing diameter) and a core cowl length ratio (which is equal to an under-core cowl axial length divided by an overall core axial length). In particular, the inventors of the present disclosure have found that these ratios can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs. In some embodiments, the inventors found that selectively coupling one or more engine components such as an engine accessory or system component to one of the core cowl or to the engine improves accessibility for inspection, repair, and maintenance and improves weigh loads on the core engine.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
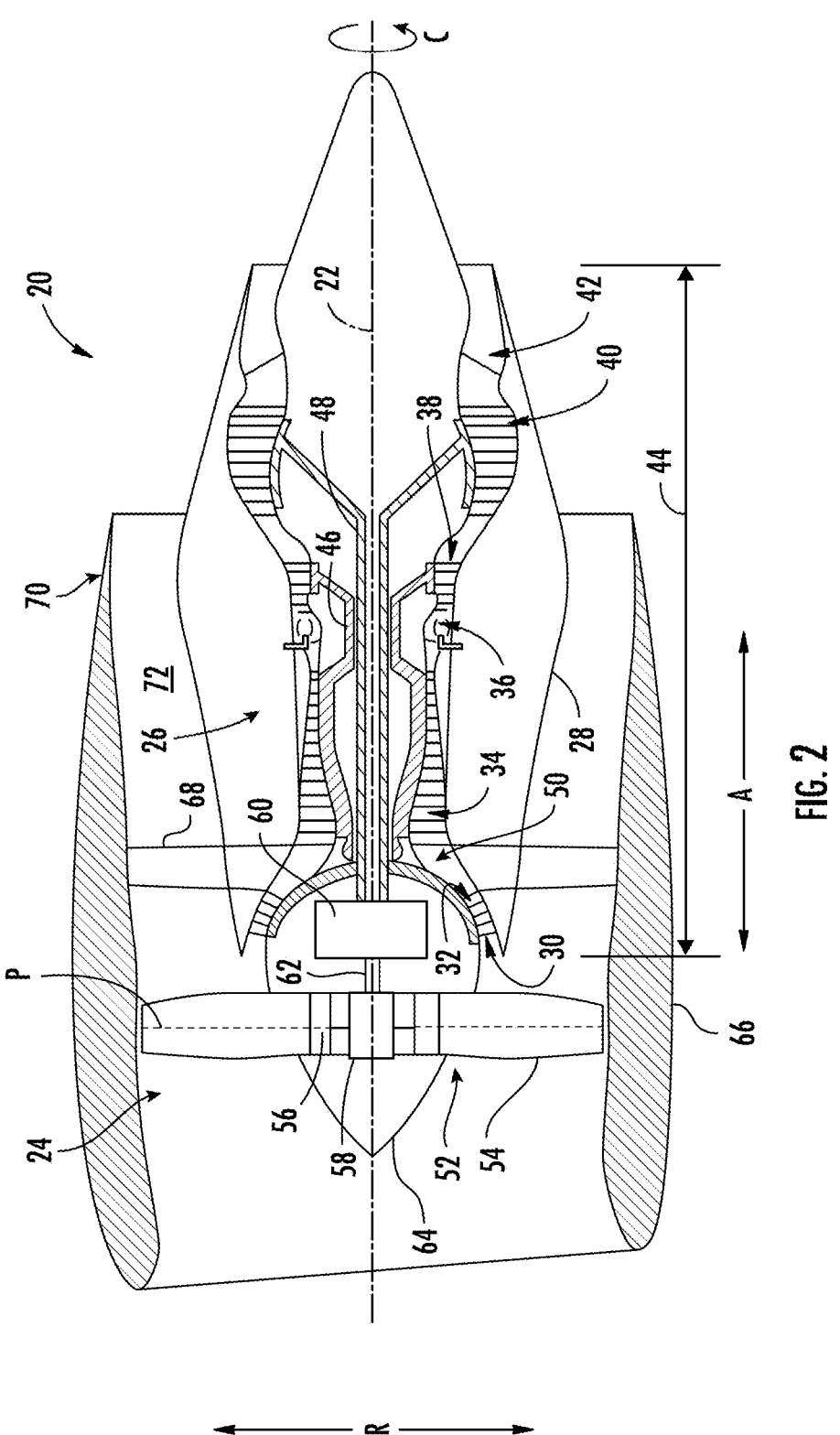
FIG. 2 is a schematic cross-sectional view of a ducted turbofan gas turbine engine in accordance with an exemplary embodiment of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an engine housing, casing, or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a suitable pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure shaft 48.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox. Utilizing a reduction gearbox may enable the comparatively higher speed operation of the low-pressure turbine 40 while maintaining fan speeds sufficient to provide for increased air bypass ratios, allowing for efficient operation of the gas turbine engine 20. Moreover, utilizing a reduction gearbox may allow for a reduction in turbine stages that would otherwise be present (e.g., in direct drive engine configurations), providing a reduction in weight and complexity of the engine.

Referring still to the exemplary embodiment of FIG. 2, the disk 56 is connected to the gearbox 60 via a fan shaft 62. The disk 56 is covered by a rotatable front hub 64 of the fan section 24 (sometimes also referred to as a "spinner"). The front hub 64 is aerodynamically contoured to promote an airflow through the plurality of fan blades 54. Additionally, the exemplary fan section 24 includes an annular fan casing or outer nacelle 66 that circumferentially surrounds the fan 52 and/or at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

Figure 3:
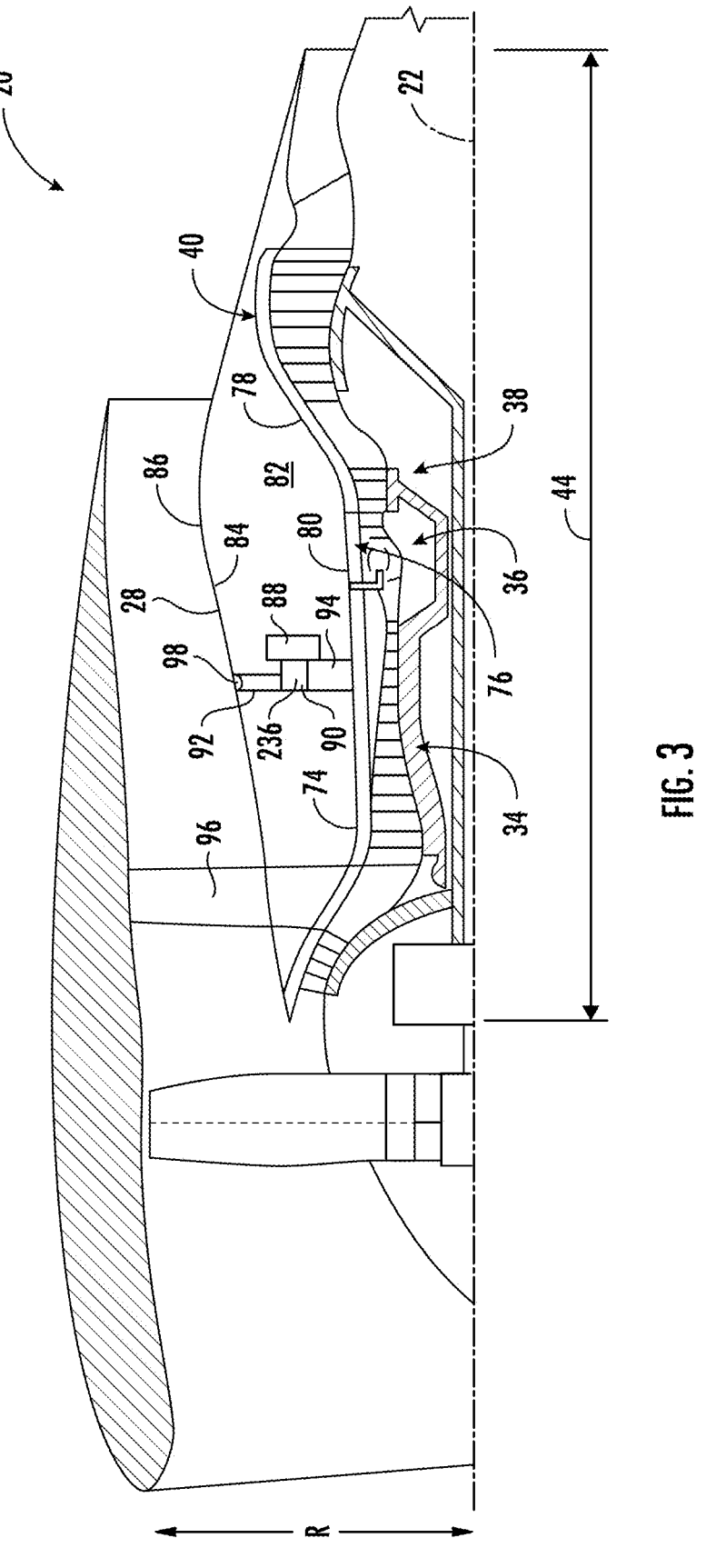
FIG. 3 is a schematic cross-sectional view of a portion of the ducted turbofan gas turbine engine shown in FIG. 2, in accordance with an exemplary embodiment of the present disclosure.

FIG. 3 is a schematic cross-sectional view of a portion of the core engine 44 of the gas turbine engine 20 as shown in FIG. 2, according to an exemplary embodiment of the present disclosure. As shown in FIG. 3, the high-pressure compressor 34 is encased within a compressor casing 74. The combustion section 36 is encased within a combustor casing 76. The high-pressure turbine 38 and the low-pressure turbine 40 are encased within one or more turbine casing(s) 78. The combustor casing 76 defines an outer surface 80. A void or space 82 is defined between an inner surface 84 of the core cowl 28 and the outer surface 80 of the combustor casing 76. The core cowl 28 further includes an outer surface 86 radially spaced from the inner surface 84 with respect to radial direction R. In exemplary embodiments, at least one engine component 88 is coupled to the core cowl 28 inner surface 84. The at least one engine component 88 may include but is not limited to valves, electronics including engine and system controllers, fire and overheat detection system components, fire extinguisher components, heat exchangers, pumps, generator, etc.

In exemplary embodiments, engine component 88 is selectively coupled to the core engine 44 or the core cowl 28. When the engine component 88 is coupled to the core cowl 28, the engine component 88 travels with the core cowl 28 when pivoted away from the core engine 44. When the engine component 88 is coupled to the core engine 44, the engine component 88 stays coupled to the core engine 44 when the core cowl 28 is pivoted away from the core engine 44. In exemplary embodiments and as previously presented, the engine component 88 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 28 or the core engine 44.

In exemplary embodiments, the engine component 88 is selectively coupled to the core engine 44 or the core cowl 28 via a fastener 90. As shown in FIG. 3, the fastener 90 may be disposed between a core cowl structure 92 such as a strut or bracket, and a core engine structure 94 such as a strut, a casing or bracket. The core cowl structure 92 may be fixedly coupled to the core cowl 28, such that the core cowl structure 92 moves with the core cowl 28, as described below. By contrast, the core engine structure 94 is not moveable with the core cowl 28 and instead may be fixedly coupled to a stationary and structural component of the core engine 44, such as the compressor casing 74 (as in the embodiment depicted), or one or more of the combustor casing 76, turbine casing 78, or a support frame such as a compressor frame 96, a mid-frame, or a rear support frame or turbine frame, etc.

The fastener 90 may be fixedly connected to the engine component 88. The fastener 90 may comprise a cam lock type fitting, bayonet fitting, quarter-turn fastener or other mechanical or electromechanical fastener or device that allows selectively coupling the engine component 88 to the core cowl 28 or the core engine 44. In particular embodiments, the core cowl 28 defines or includes an access opening or hatch 98 wherein the fastener 90 is accessible from the access opening 98.

Figure 4:
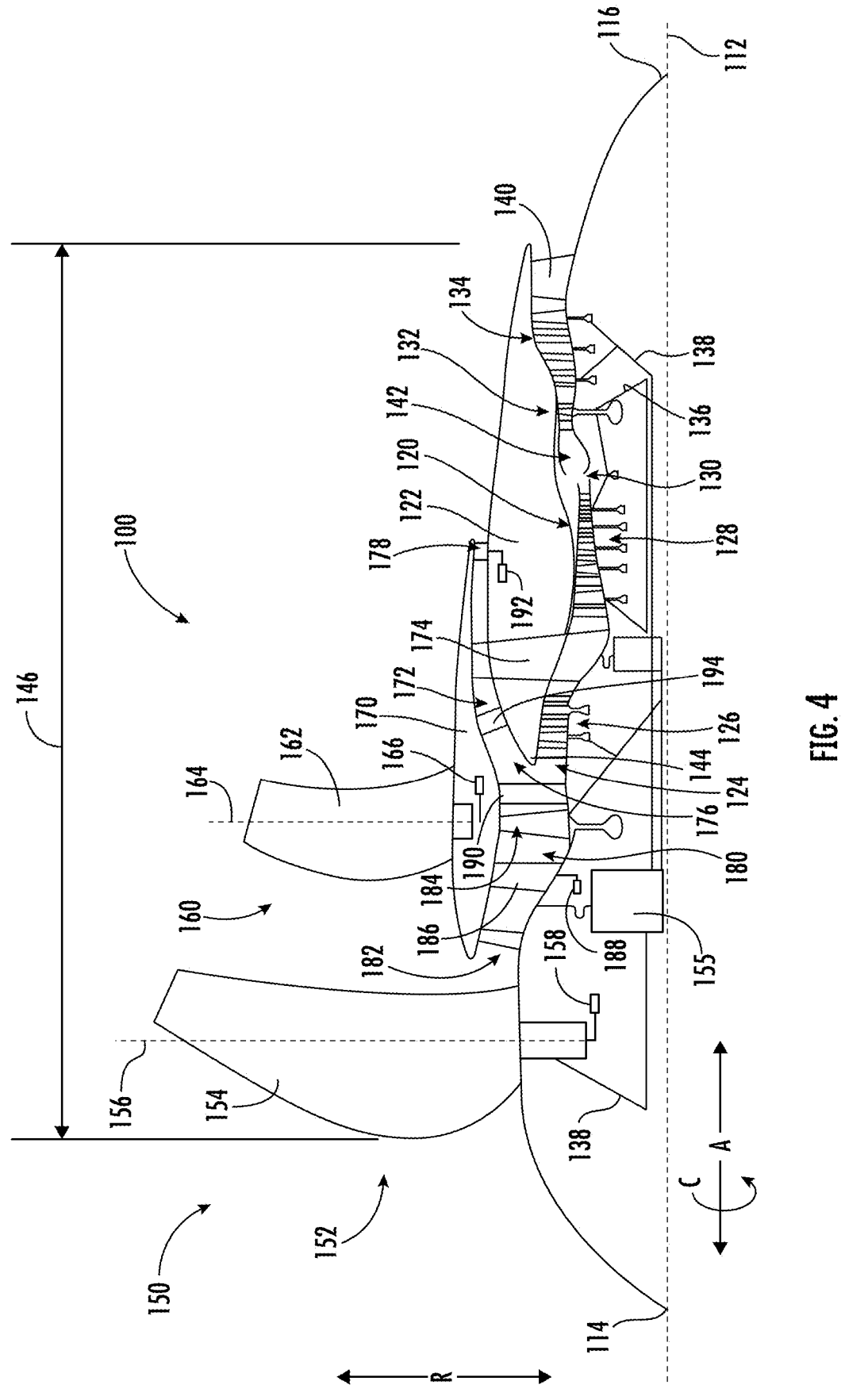
FIG. 4 is a schematic cross-sectional view of a three-stream engine in accordance with an exemplary embodiment of the present disclosure.

It should be appreciated, however, that the exemplary gas turbine engine 20 depicted in FIGS. 2 and 3 is provided by way of example only, and that in other exemplary embodiments, the gas turbine engine 20 may have other configurations. For example, FIG. 4 is a schematic cross-sectional view of a gas turbine engine 100 according to another example embodiment of the present disclosure. Particularly, FIG. 4 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 4 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

As shown in FIG. 4 the engine 100 includes a turbomachine 120 having a fan section 150 that is positioned upstream thereof. Generally, the turbomachine 120 includes, in serial flow order, a compressor section, a combustion section, a turbine section, and an exhaust section. Particularly, as shown in FIG. 4, the turbomachine 120 includes a housing or core cowl 122 that defines an annular core inlet 124. The core cowl 122 further encloses at least in part a low-pressure system and a high-pressure system. For example, the core cowl 122 depicted encloses and supports at least in part a booster or low-pressure ("LP") compressor 126 for pressurizing the air that enters the turbomachine 120 through core inlet 124. A high-pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low-pressure" are used with respect to the high-pressure/high speed system and low-pressure/low speed system interchangeably. Further, it will be appreciated that the terms "high" and "low" are used in this same context to distinguish the two systems and are not meant to imply any absolute speed and/or pressure values.

The high energy combustion products flow from the combustor 130 downstream to a high-pressure turbine 132. The high-pressure turbine 132 drives the high-pressure compressor 128 through a high-pressure shaft 136. In this regard, the high-pressure turbine 128 is drivingly coupled with the high-pressure compressor 128. The high energy combustion products then flow to a low-pressure turbine 134. The low-pressure turbine 134 drives the low-pressure compressor 126 and components of the fan section 150 through a low-pressure shaft 138. In this regard, the low-pressure turbine 134 is drivingly coupled with the low-pressure compressor 126 and components of the fan section 150. The low-pressure shaft 138 is coaxial with the high-pressure shaft 136 in this example embodiment. After driving each of the high-pressure turbine 132 and the low-pressure turbine 134, the combustion products exit the turbomachine 120 through a rear support frame or turbomachine exhaust nozzle 140. A core engine 146 of the gas turbine engine 100 is defined as the part of the gas turbine engine 100 that extends from the fan section 150 to the rear support frame or turbomachine exhaust nozzle 140.

Accordingly, the turbomachine 120 defines a working gas flowpath or core duct 142 that extends between the core inlet 124 and the rear support frame or turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream. The fan section 150 includes a fan 152, which is the primary fan in this example embodiment. For the depicted embodiment of FIG. 4, the fan 152 is an open rotor or unducted fan 152. In such a manner, the engine 100 may be referred to as an open rotor engine. Moreover, it will be appreciated that the fan section 150 includes a single fan 152, and the fan 152 is the only unducted fan of the gas turbine engine 100 depicted.

As depicted, the fan 152 includes a plurality or an array of fan blades 154 (only one shown in FIG. 4). The fan blades 154 are rotatable, e.g., about the longitudinal axis 112. As noted above, the fan 152 is drivingly coupled with the low-pressure turbine 134 via the low-pressure shaft 138. For the embodiments shown in FIG. 1, the fan 152 is coupled with the low-pressure shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 4) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 4 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 1166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan housing or fan cowl 170.

As shown in FIG. 4, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low-pressure turbine 134 (e.g., coupled to the low-pressure shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 4) arranged in a single stage, such that the ducted fan 184 may be referred to as a single stage fan. The fan blades of the ducted fan 184 can be arranged in equal circumferential spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially extending and circumferentially spaced stationary struts 174 (only one shown in FIG. 4).

The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The exemplary engine 100 shown in FIG. 4 also defines or includes an inlet duct 180. The inlet duct 180 extends between the engine inlet 182 and the core inlet 124 and fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or the leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third-stream thrust, Fn3S (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112.

Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third-stream thrust, Fn3S, during one or more engine operating conditions. Further, by introducing a variability in the geometry of the inlet guide vanes 186 and the fan exhaust nozzle 178, the engine 100 may be capable of generating more efficient third-stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 4, in exemplary embodiments, air passing through the fan duct 172 may be relatively cooler (e.g., lower temperature) than one or more fluids utilized in the turbomachine 120. In this way, one or more heat exchangers 194 may be positioned in thermal communication with the fan duct 172. For example, one or more heat exchangers 194 may be disposed within the fan duct 172 and utilized to cool one or more fluids from the core engine 146 with the air passing through the fan duct 172, as a resource for removing heat from a fluid, e.g., compressor bleed air, oil or fuel.

Although not depicted in detail, the heat exchanger 194 may be an annular heat exchanger extending substantially 360 degrees in the fan duct 172 (e.g., at least 300 degrees, such as at least 330 degrees). In such a manner, the heat exchanger 194 may effectively utilize the air passing through the fan duct 172 to cool one or more systems of the engine 100 (e.g., lubrication oil systems, compressor bleed air, electrical components, etc.). The heat exchanger 194 uses the air passing through duct 172 as a heat sink and correspondingly increases the temperature of the air downstream of the heat exchanger 194 and exiting the fan exhaust nozzle 178.

Figure 5:
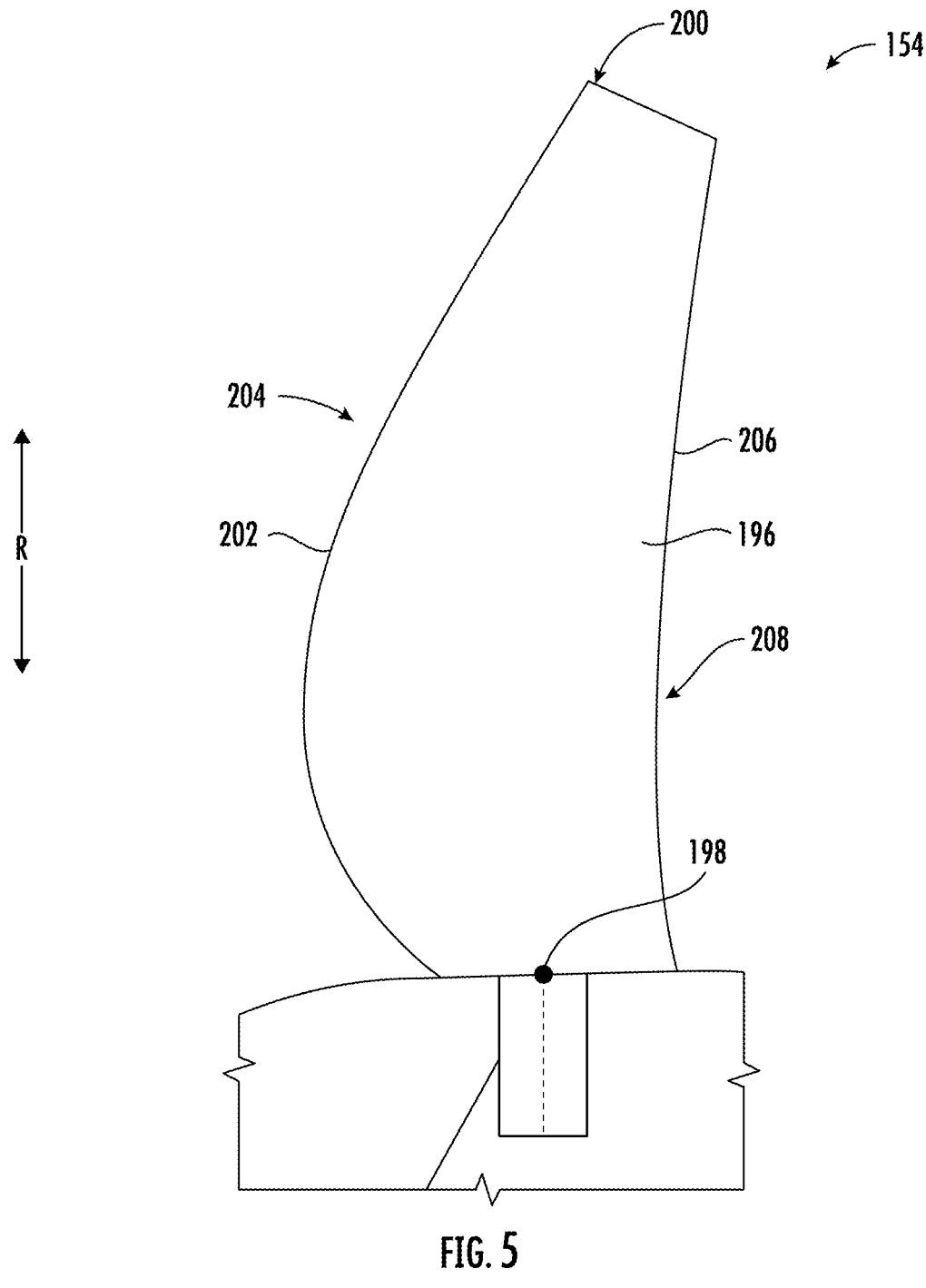
FIG. 5 is an enlarged view of an exemplary fan blade according to exemplary embodiments of the present disclosure.

FIG. 5 is an enlarged view of an exemplary fan blade 154 of the plurality or array of fan blades 154 as shown in FIG. 4, according to exemplary embodiments of the present disclosure. As previously presented, each fan blade 154 has an airfoil or blade body 196. The blade body 196 spans in the radial direction R between a root 198 and a tip 200 of the blade body 196. The blade body 196 includes a leading edge 202 that extends along the span between the root 198 and the tip 200 along an upstream or forward portion 204 of the fan blade 154. The blade body 196 further includes a trailing edge 206 that extends along the span between the root 198 and the tip 200 along a downstream or aft portion 208 of the fan blade 154.

Figure 6:
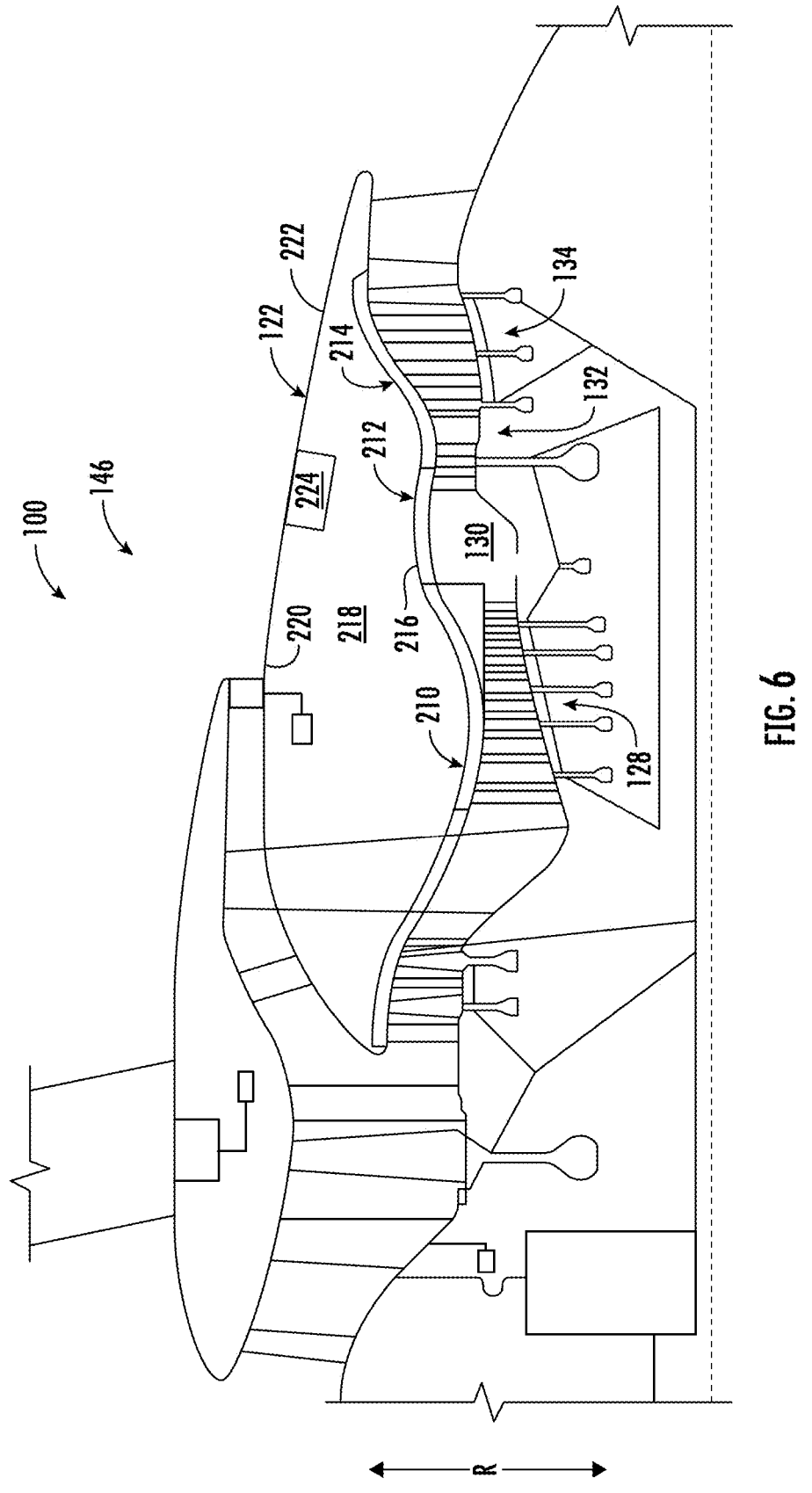
FIG. 6 is a schematic cross-sectional view of a portion of a core engine of the gas turbine engine as shown in FIG. 4, according to an exemplary embodiment of the present disclosure.

FIG. 6 is a schematic cross-sectional view of a portion of the core engine 146 of the gas turbine engine 100 as shown in FIG. 4, according to an exemplary embodiment of the present disclosure. As shown in FIG. 6, the high-pressure compressor 128 is encased within a compressor casing 210. The combustor 130 is encased within a combustor casing 212. The high-pressure turbine 132 and the low-pressure turbine 134 are encased within one or more turbine casing(s) 214. The combustor casing 212 defines an outer surface 216. A void or space 218 is defined between an inner surface 220 of the core cowl 122 and the outer surface 216 of the combustor casing 212. The core cowl 122 further includes an outer surface 222 radially spaced from the inner surface 220 with respect to radial direction R. In exemplary embodiments, at least one engine component 224 is attached to the core cowl 122 inner surface 220. The at least one engine component 224 may include but is not limited to valves, electronics including engine and system controllers, fire and overheat detection system components, fire extinguisher components, heat exchangers, pumps, generator, etc.

Figure 7:
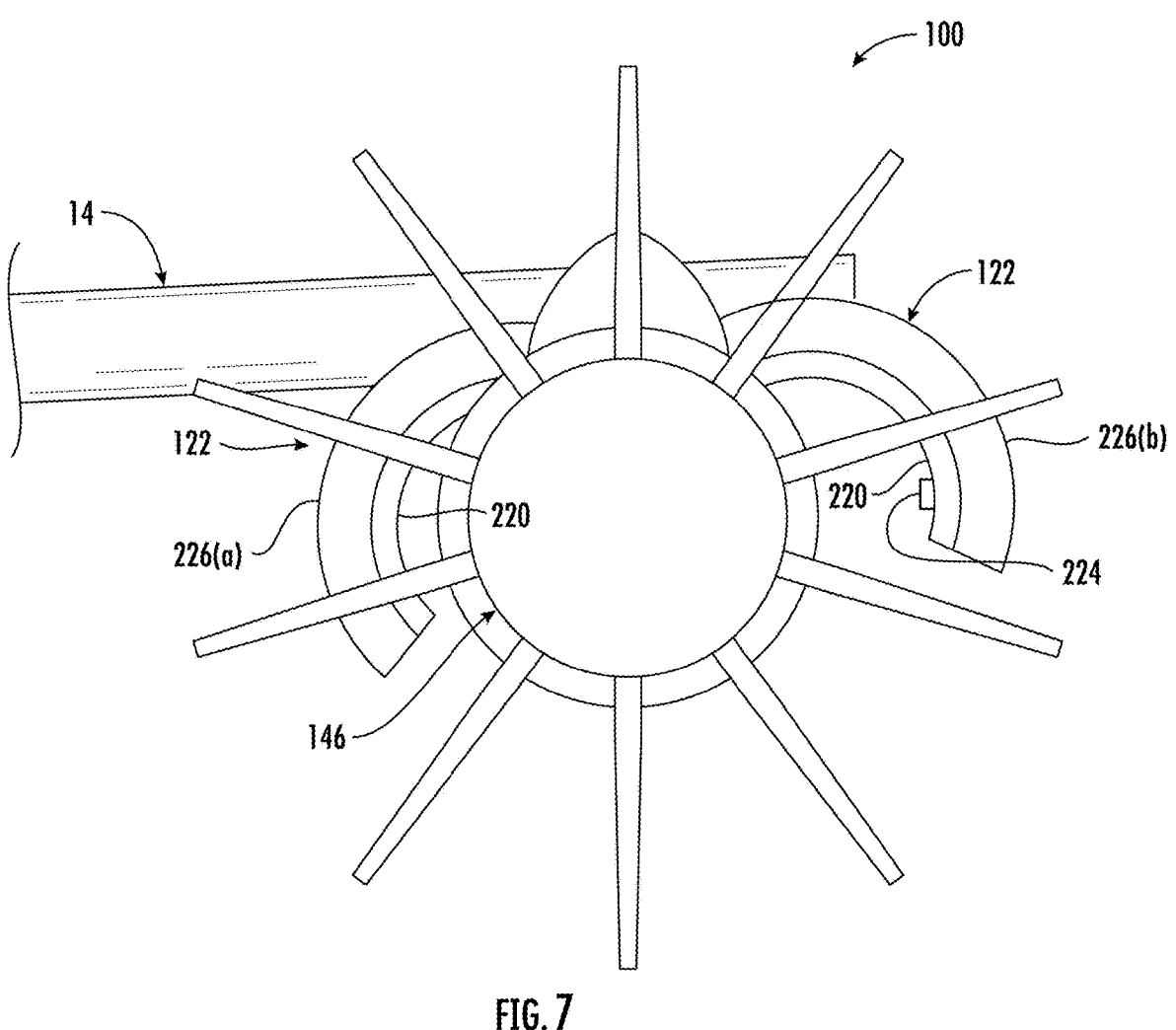
FIG. 7 is a front view of a portion of the gas turbine engine as shown in FIGS. 4 and 6, mounted to a portion of an exemplary wing according to exemplary embodiments of the present disclosure.

FIG. 7 is a front view of a portion of the gas turbine engine 100 as shown in FIGS. 4 and 6, mounted to a portion of an exemplary wing 14 according to exemplary embodiments of the present disclosure. It should be noted that fan section 150 (shown in FIG. 4) is not shown in FIG. 7 for clarity. As shown in FIG. 7, the core cowl 122 is formed from at least two shells 226(*a*), 226(*b*). It should be appreciated that the core cowl 122 shown in FIG. 7 may also be representative of the core cowl 28 shown in FIGS. 2 and 3. The shells 226(*a*), 226(*b*) are pivotally mounted to the gas turbine engine 100 to allow the shells 226(*a*), 226(*b*) to swing upward and away from the core engine 146, exposing several engine accessories and systems of the core engine 146 such as engine component 224 or engine component 88 from FIG. 3, for inspection, repair, and maintenance. The shells 226(*a*), 226(*b*) are shown in FIG. 7 in an at least partially open state. When coupled to the inner surface 220 of the core cowl 122, the one or more engine accessories or engine systems will move with the core cowl 122 when the shells 226(*a*) and 226(*b*) are moved between open and closed positions.

Figure 8:
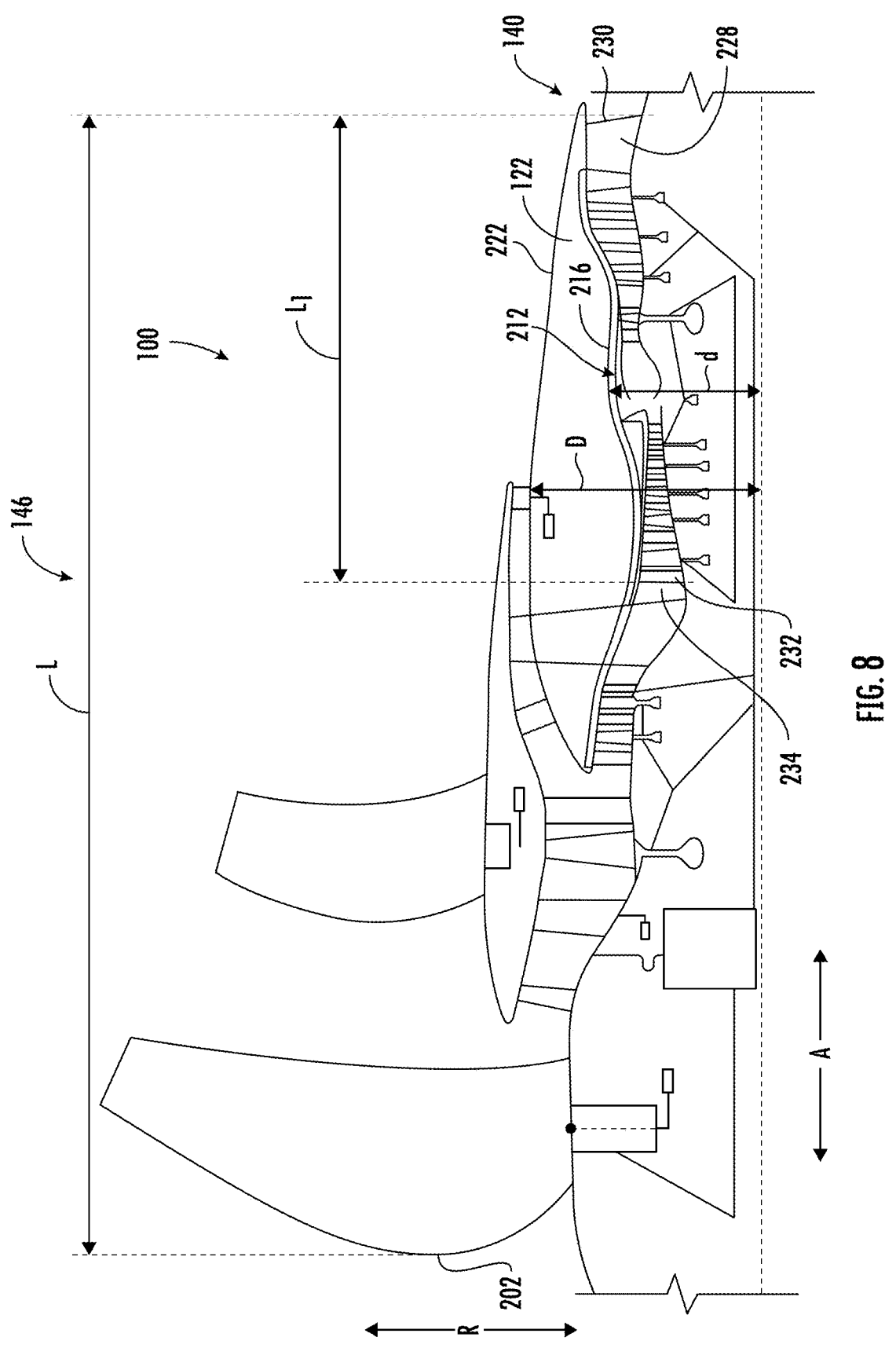
FIG. 8 is a schematic cross-sectional view of the gas turbine engine as shown in FIG. 4, according to an exemplary embodiment of the present disclosure.

FIG. 8 is a schematic cross-sectional view of the gas turbine engine 100 as shown in FIG. 4, according to an exemplary embodiment of the present disclosure. As shown in FIG. 8 the outer surface 222 of the core cowl 122 defines a peak cowl diameter (D) in the radial direction R with respect to axial centerline 112. The outer surface 216 of the combustor casing 212 defines a maximum combustor casing diameter (d) along the radial direction R with respect to axial centerline 112. The core engine 146 defines an overall core axial length (L) along the axial direction A with respect to axial centerline 112. An under-core cowl axial length (L1) is defined along the axial direction A with respect to axial centerline 112.

In exemplary embodiments, as shown in FIG. 8, the turbomachine rear support frame or exhaust nozzle 140 includes a strut 228 having a trailing edge 230 within a working gas flowpath of the gas turbine engine 100. The overall core axial length (L) is measured from a forward-most portion of the leading edge 202 of a respective primary fan blade 154 to an aft-most portion of the trailing edge 230 of the strut 228. The gas turbine engine 100 further includes a high-pressure compressor inlet guide vane 232 having a leading edge 234 where the under-core cowl axial length (L1) along the axial direction is measured from the leading edge 234 of the high-pressure compressor inlet guide vane 232 to the trailing edge of the strut 228.

Figure 9:
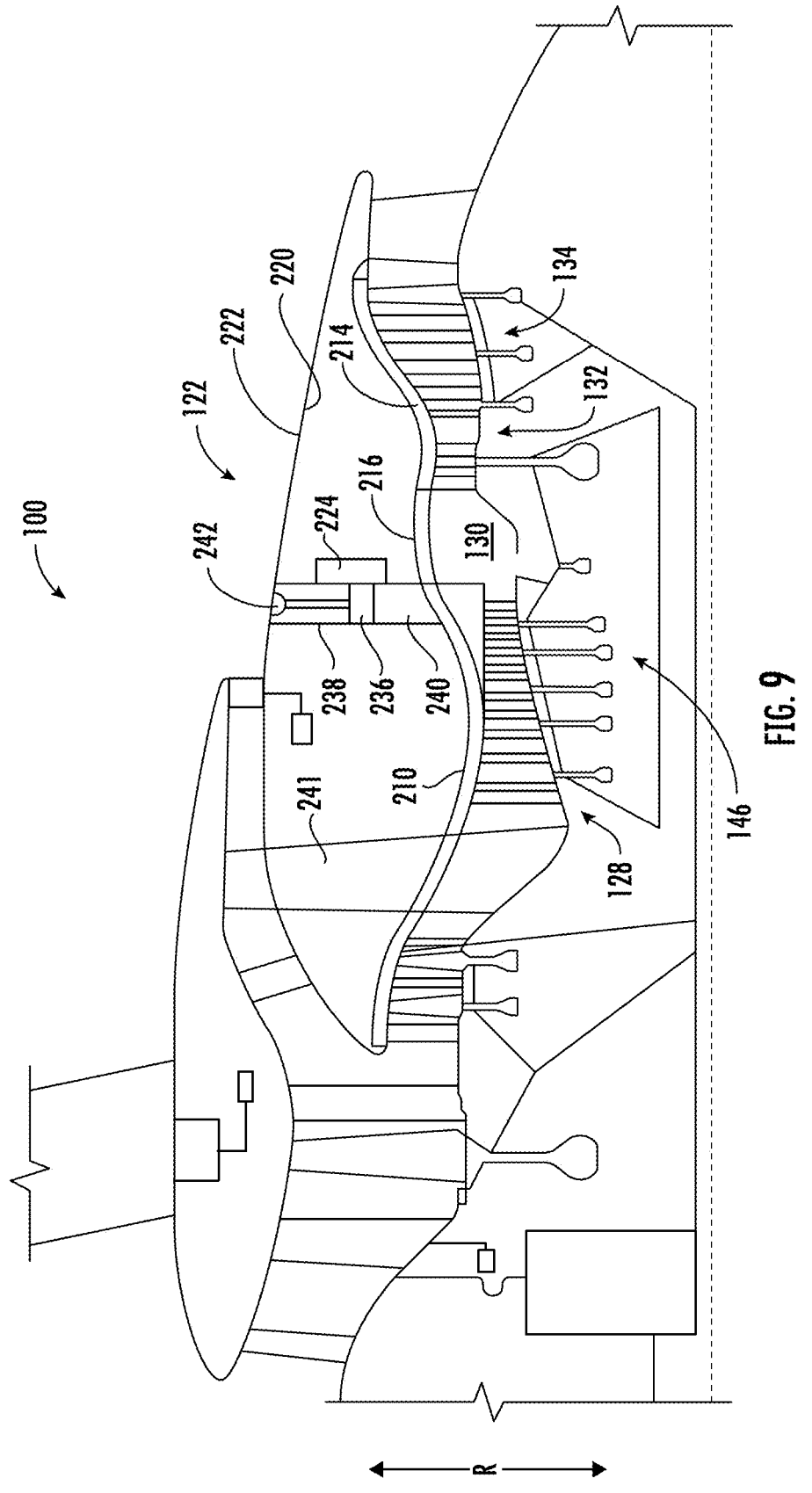
FIG. 9 is a schematic cross-sectional view of the gas turbine engine as shown in FIG. 4, according to an exemplary embodiment of the present disclosure.

FIG. 9 is a schematic cross-sectional view of the gas turbine engine 100 as shown in FIG. 4, according to an exemplary embodiment of the present disclosure. In exemplary embodiments, engine component 224 is selectively coupled to the core engine 146 or the core cowl 122. When the engine component 224 is coupled to the core cowl 122, the engine component 224 travels with the core cowl 122 when pivoted away from the core engine 146. When the engine component 224 is coupled to the core engine 146, the engine component 224 stays coupled to the core engine 146 when the core cowl 122 is pivoted away from the core engine 146. In exemplary embodiments and as previously presented, the engine component 224 is one of a heat exchanger, a sensor, a controller, a pump, a duct, a valve, fire and overheat detection system components, fire extinguisher components, or a generator. It should be appreciated that this list is not all inclusive of possible engine components that may be selectively coupled to the core cowl 122 or the core engine 146.

In particular, it will be appreciated that in at least certain exemplary embodiments, the engine component 224 may be the controller, such as an engine controller, such as a full authority digital engine control ("FADEC") controller. As will be appreciated, the gas turbine engine 100 depicted includes an unducted fan (see, e.g., unducted fan 152 in FIG. 4). In such a manner, the gas turbine engine 100 does not include a nacelle surrounding the fan (see, e.g., nacelle 66 surrounding fan 52 in FIG. 2). Without the nacelle, the engine controller may need to be located within the core cowl 122 of the gas turbine engine 100. As will further be appreciated, however, the environment within the core cowl 122 may be much hotter than within a nacelle, particularly closer to the turbomachinery components (e.g., the HP compressor, combustor, and HP turbine). Accordingly, positioning the engine controller outwardly along the radial direction R from the turbomachinery components and, e.g., selectively coupled to the core cowl 122 may reduce a temperature of the engine controller during operation of the gas turbine engine 100 to maintain a temperature of the engine controller below a maximum threshold for the electronics of the engine controller (e.g., below 200 degrees Fahrenheit), and allow for positioning of the engine controller within the core cowl 122. Briefly, a ratio of the peak cowl diameter (D) in the radial direction R and maximum combustor casing diameter (d) along the radial direction R may further facilitate such a positioning of the engine controller.

It should be appreciated, however, that in other embodiments, the engine component 224 may additionally or alternatively be any other suitable component traditionally found within a nacelle of a ducted gas turbine engine, such as a lubrication oil tank, a lubrication oil pump, power electronics (e.g., inverters), electric machines, etc. Moreover, although the engine controller is described as being positioned within the core cowl 122 above, in other embodiments, the engine controller and/or one or more other suitable components traditionally found within a nacelle of a ducted gas turbine engine may be positioned within a pylon used to mount the gas turbine engine to an aircraft (such as to a wing or fuselage of the aircraft).

In exemplary embodiments, the engine component 224 is selectively coupled to the core engine 146 or the core cowl 122 via a fastener 236. As shown in FIG. 9, the fastener 236 may be disposed between a core cowl structure 238 such as a strut or bracket, and a core engine structure 240 such as a strut, a casing or bracket. The core cowl structure 238 may be fixedly coupled to the core cowl 122, such that the core cowl structure 238 moves with the core cowl 122, as described below. By contrast, the core engine structure 240 is not moveable with the core cowl 122 and instead may be fixedly coupled to a stationary and structural component of the core engine 146, such as the compressor casing 210 (as in the embodiment depicted), or one or more of the combustor casing 212, turbine casing 214, or a support frame such as a compressor frame 241, a mid-frame, or rear support frame (not shown) or turbomachine exhaust nozzle 140 (FIG. 2), etc.

The fastener 236 may be fixedly connected to the engine component 224. The fastener 236 may comprise a cam lock type fitting, bayonet fitting, quarter-turn fastener or other mechanical or electromechanical fastener or device that allows selectively coupling the engine component 224 to the core cowl 122 or the core engine 146. In particular embodiments, the core cowl 122 defines or includes an access opening or hatch 242 wherein the fastener 236 is accessible from the access opening 242.

Figures 10, 11:
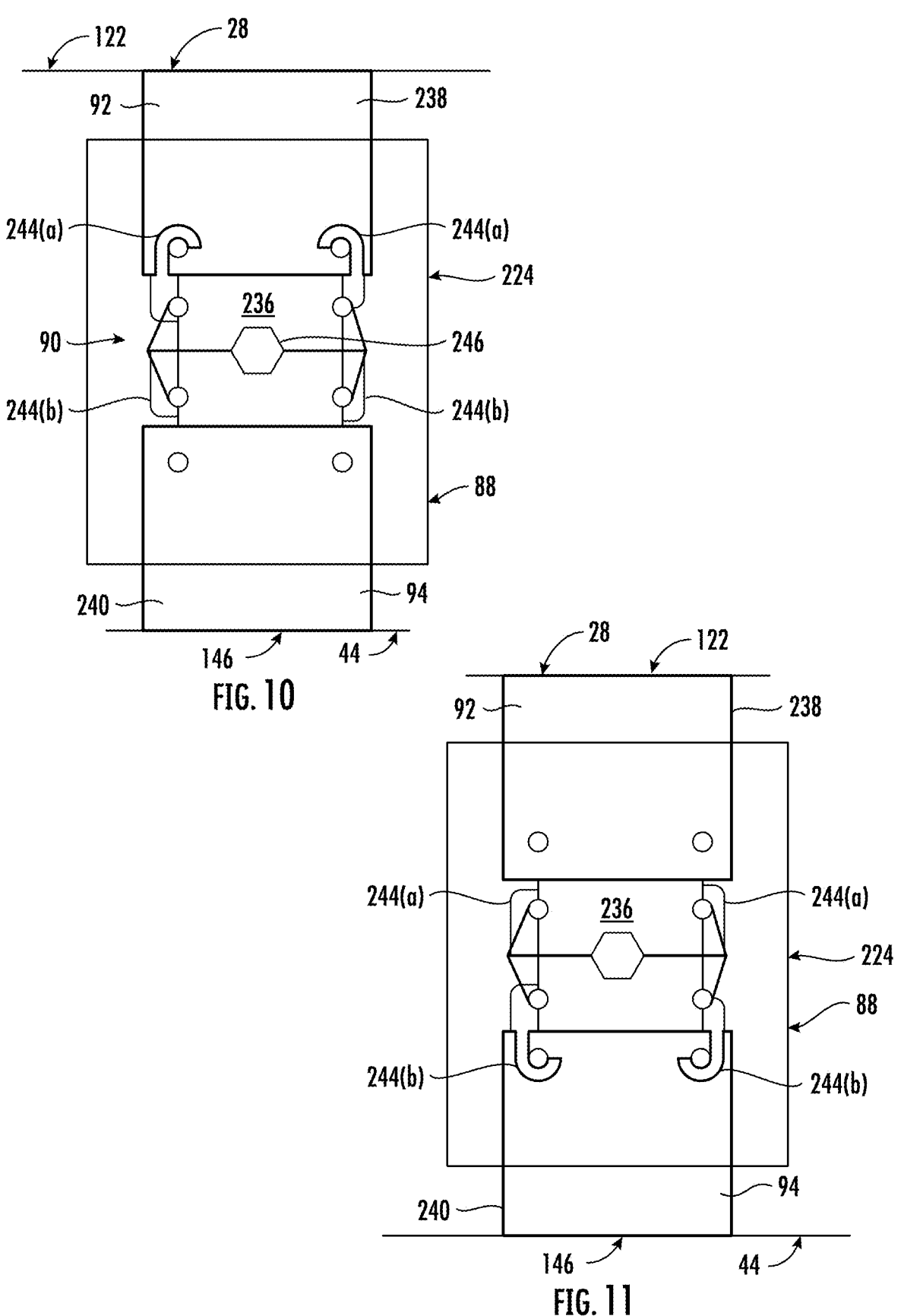
FIG. 10 is a schematic illustration including an engine component, a portion of a core cowl structure, an exemplary fastener and a portion of a core engine structure according to exemplary embodiments of the present disclosure.
FIG. 11 is a schematic illustration including an engine component, a portion of a core cowl structure, an exemplary fastener and a portion of a core engine structure according to exemplary embodiments of the present disclosure.

FIGS. 10 and 11 are schematic illustrations including engine component 224 or engine component 88, a portion of core cowl structure 238 or core cowl structure 92, an exemplary fastener 236 or fastener 90, and a portion of the core engine structure 240 or core engine structure 94 according to the present disclosure. In at least one embodiment, as shown in FIG. 10, the fastener 236, 90 includes a first plurality of articulating tabs 244(*a*) and a second plurality of articulating tabs 244(*b*). The tabs 244(*a*), 244(*b*) may be articulated about a pivot point 246 via a key or tool (not shown). The key or tool may be inserted through the access opening 242, 98 shown in FIGS. 9 and 3.

In an exemplary embodiment, as show in FIG. 10, when in a first position the first plurality of tabs 244(*a*) engages with the core cowl structure 238, 92 and the second plurality of tabs 244(*b*) disengage from the core engine structure 240, 94, coupling the engine component 224, 88 to the core cowl 122, 28 and decoupling the engine component 224, 88 from the core engine 146, 44. In this configuration, the engine component 224, 88 will travel with the core cowl 122, 28 when it is opened and rotated outward from the core engine 146, 44. In addition, in this configuration, the core cowl 122, 28 may carry the weight load of the engine component 224, 88 during operation of the gas turbine engine 100.

As shown in FIG. 11, when in a second position the first plurality of tabs 244(*a*) are disengaged from the core cowl structure 238, 92 and the second plurality of tabs 244(*b*) are engaged with the core engine structure 240, 94 coupling the engine component 224, 88 to the core engine 146, 44, and decoupling the engine component 224, 88 from the core cowl 122, 28. In this configuration, the engine component

224, 88 will be rigidly coupled to the core engine 146, 44 whether the core cowl 122, 28 is opened or closed.

Figures 12, 13:
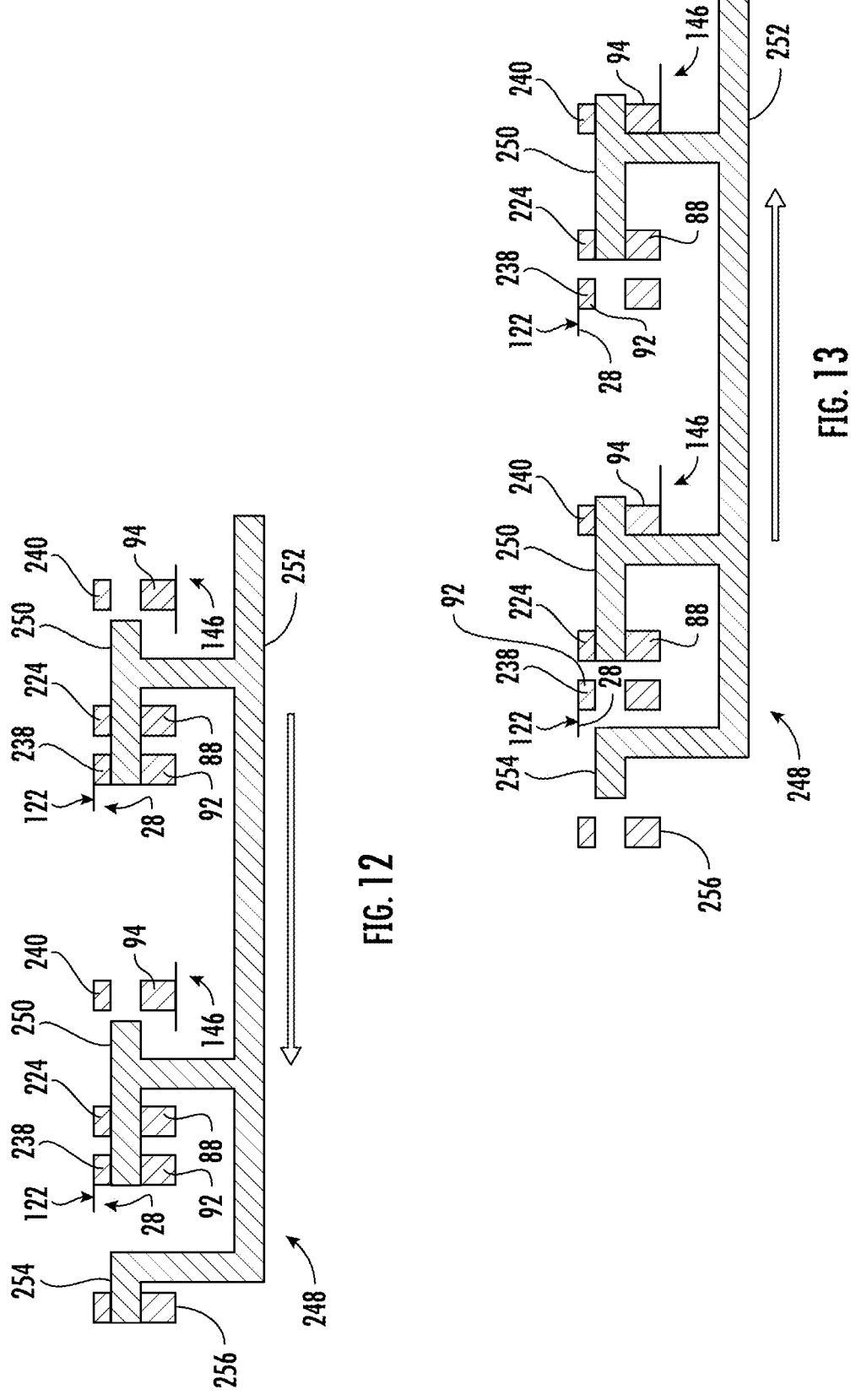
FIG. 12 is a schematic illustration including an engine component, a portion of a core cowl structure, a push-pull mechanism, and a portion of a core engine structure according to exemplary embodiments of the present disclosure.
FIG. 13 is a schematic illustration including an engine component, a portion of a core cowl structure, a push-pull mechanism, and a portion of a core engine structure according to exemplary embodiments of the present disclosure.

FIGS. 12 and 13 are schematic illustrations including engine component 224, 88, a portion of core cowl structure 238, 92, a push-pull mechanism 248, and a portion of the core engine structure 240, 94 according to exemplary embodiments of the present disclosure. In various embodiments, as shown in FIGS. 12 and 13, the engine component 224, 88 is selectively coupled to the core cowl 122, 28 (FIG. 12) or the core engine 146 (FIG. 13) via push-pull mechanism 248. The push-pull mechanism 248 includes at least one protrusion or pin 250 fixed to a slidable rod 252. In a first position, as shown in FIG. 12, the pin(s) 250 engage(s) with the engine component 224, 88 and the core cowl 122, 28 via the core cowl structure 238, 92 and are disengaged from the core engine 146. In a second position, as shown in FIG. 13, the pin(s) 250 engage(s) with the with the engine component 224, 88 and the core engine 146, 44 via the core engine structure 240, 94 and are disengaged or decoupled from the core cowl 122, 28. In exemplary embodiments, the slidable rod 252 may be manipulated between the first position and the second position by a technician manually. In other embodiments, the slidable rod 252 may be manipulated between the first position and the second position hydraulicly or electrically. The slidable rod 252 will be movable while the core cowl 122, 28 is in a closed or at least partially closed state.

In exemplary embodiments as shown in FIGS. 12 and 13, the push-pull mechanism includes a second pin 254. As shown in FIG. 12 the second pin 254 engages with a door counterbalance mechanism or system 256 when the first pin(s) 250 is/are engaged with the core cowl 122, 28 and the engine component 244, 88. In exemplary embodiments, the door counterbalance mechanism 256 includes either a spring, or pressurized gas strut to counterbalance the weight of the core cowl 122, 28 as it is manipulated between open and closed states.

As alluded to earlier, the inventors discovered, unexpectedly during the course of gas turbine engine design—i.e., designing gas turbine engines having a variety of different primary fan and secondary fan characteristics—and evaluating an overall propulsive efficiency, significant relationships exist in a ratio of a core cowl diameter ratio (CDR), equal to the peak cowl diameter (D) divided by the maximum combustor casing diameter (d), and a core cowl length ratio (CLR), equal to the under-core cowl axial length (L1) divided by the overall core axial length (L). These relationships can be thought of as an indicator of the ability of a gas turbine engine to provide sufficient packaging space between the core engine combustor casing and the core cowl for packaging/mounting various accessories and/or engine systems, while also having a core engine capable of producing sufficient power to drive primary and secondary fans, particularly in more complex engine designs.

As engines become more complex (e.g., hybrid electric/ load sharing between shafts, closed-loop thermal management systems, hot fuel, unducted, etc.), a reduction in core cowl size is concomitantly desired for greater overall engine performance. This, along with, in the case of an open rotor design (FIG. 4), the elimination of an outer nacelle enclosing a primary fan of the engine, has posed a significant challenge with engine accessory and engine support system packaging design that was not previously present in earlier engine designs. It will also be appreciated that a reduction in overall core engine axial length results in a reduction in space for packaging various engine accessories and support system components which are typically coupled to the outer nacelle, the core engine casings, or to various support frames of the gas turbine engine, generally beneath the core cowl.

It will be appreciated that a larger core cowl diameter is preferred to accommodate the packaging needs of a particular gas turbine engine design. However, if the core cowl diameter is too large various issues such as excess drag and weight may affect overall engine performance or propulsion efficiency. In addition, or in the alternative, if the core cowl is too large for a particular gas turbine engine design, issues with mounting and installing the engine occur. It will also be appreciated that a smaller core length for a given engine design provides various benefits, including but not limited to, reduced overall engine weight. This particular design is enabled at least in part by the three-stream engine design described above which provides less flow through the engine core for a given thrust output. However, it is to be appreciated that the engine length cannot be too small because of the power required to drive primary and mid-fans of the three-stream engine.

It will moreover be appreciated that elements that previously were previously mounted to the nacelle and that are temperature sensitive, i.e., electronics, FADEC, have more limited/restricted areas where they can reside within the engine. For example, it was found that for the 3-stream engine embodiment that the FADEC is preferably located in the space located between third stream and outer nacelle, or forward of the compressor.

It will moreover be appreciated that inventors considered placement alternatively within the aircraft pylon supporting the engine (not shown in drawings). The discovery, below (Expression (1) and (2)) may be equally insightful and define the packaging size in those cases where some of the engine components normally housed in nacelle are moved to pylon, and where those components are located within the core cowl.

Notably, however, an engine having a core cowl diameter ratio (CDR) within the ranges described herein, particularly when also having a core engine length ratio (CLR) within the ranges described herein, may be particularly suited for mounting one or more of the components traditionally found within a nacelle of a ducted gas turbine engine within the core cowl of the gas turbine engine. For example, an engine having a core cowl diameter ratio (CDR) within the ranges described herein, particularly when also having a core engine length ratio (CLR) within the ranges described herein, may have a sufficient amount of room for these components, and further may have a sufficient amount of separation from hot turbomachinery during operation to allow positioning of one or more of these components within the core cowl, for example, power electronics and a Full Authority Digital Engine Control (FADEC), temperature-sensitive sensors, power cables.

As noted above, the inventors of the present disclosure discovered bounding the relationships defined by the core cowl diameter ratio (CDR) to the core engine length ratio (CLR) can result in a gas turbine engine maintaining or even improving upon a desired propulsive efficiency, while also taking into account the gas turbine engine's packaging concerns, weight concerns, and power requirements. The relationship discovered, infra, can identify an improved engine configuration suited for a particular mission requirement, one that takes into account installation, packaging and loading, power requirements, and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight could be greatly diminished, facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$CDR = D/d \tag{1}$$

$$CLR = L1/L \tag{2}$$

where CDR is maximum core cowl diameter D to maximum combustor casing diameter ratio d, and CLR is under-core cowl axial length L1 divided by overall core axial length L.

Values for various parameters of the influencing characteristics of an engine defined by Expressions (1) and (2) are set forth below in TABLE 1:

TABLE 1

| Symbol | Description | Ranges appropriate for using Expression 1) |
|--------|-------------|--------------------------------------------|
| D/d | Core Cowl Diameter Ratio (CDR) | 2.7 to 3.5, such as 2.8 to 3.3, such as 2.9 to 3.1 |
| L1/L | Core Cowl Length Ratio (CLR) | 0.25 to 0.50, such as 0.3 to 0.45, such as 0.35 to 0.45, such as .40 to .45 |

Figure 14:
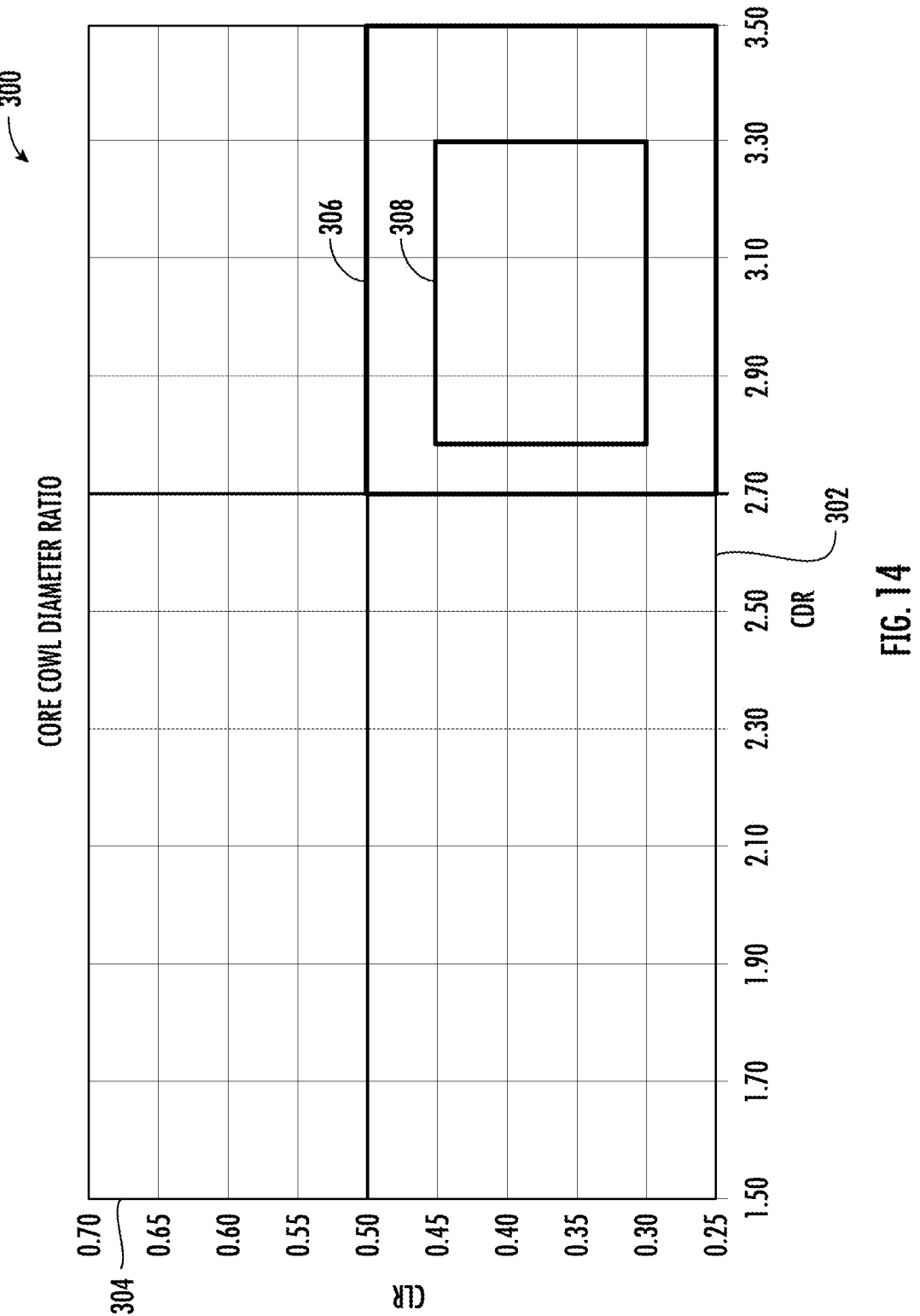
FIG. 14 is a graphical representation illustrating a relationship between CDR and CLR and showing relationships between the various parameters of Expressions (1) and (2) according to exemplary embodiments of the present disclosure.

FIG. 14 is a plot 300 illustrating the relationship between CDR and CLR and showing the relationships between the various parameters of Expressions (1) and (2). The plot 300 includes CDR values on an X-axis 302 and CLR values on a Y-axis 304. The plot 300 depicts an area 306 of CDR and CLR values where a gas turbine engine would provide sufficient packaging space between a core engine combustor casing and a core cowl for packaging/mounting various accessories and/or engine systems, while also having a core engine capable of producing sufficient power to drive primary and secondary fans. The plot 300 further depicts an area 308 of CDR and CLR values where a gas turbine engine may provide more desired packaging space between the core engine combustor casing and the core cowl for packaging/mounting various accessories and/or engine systems, while also having the core engine capable of producing sufficient power to drive primary and secondary fans. The exemplary gas turbine engine of FIG. 4 defines a CDR and a CLR within the area 308.

It will be appreciated that although the discussion above is generally relating to the open rotor engine 100 described above with reference to, e.g., FIG. 8, in various embodiments of the present disclosure, the relationships outlined above with respect to, e.g., Expressions (1) and (2) may be applied to any other suitable engine architecture.

Figure 15:
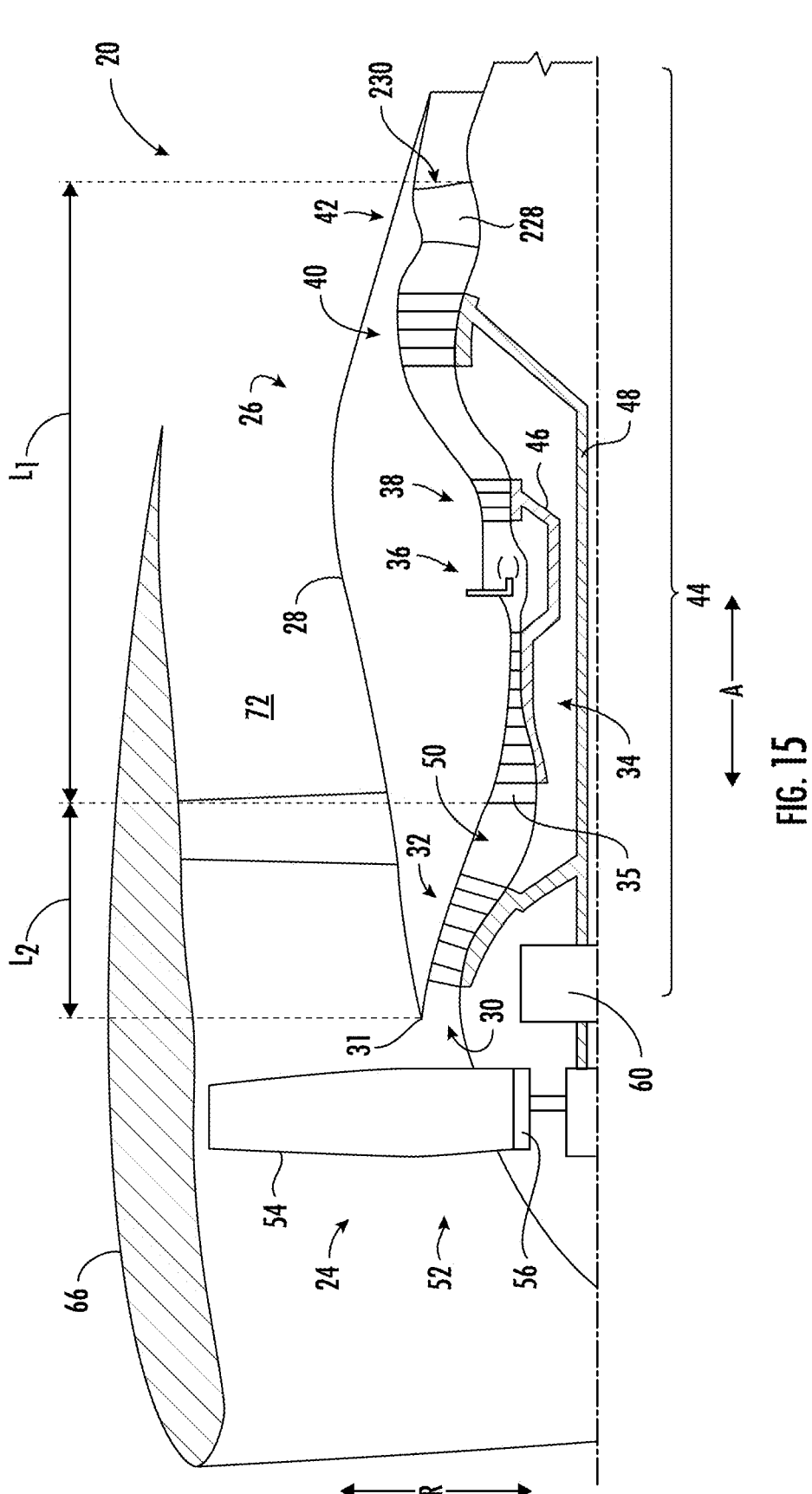
FIG. 15 is a schematic cross-sectional view of a ducted turbofan engine in accordance with an exemplary embodiment of the present disclosure.

Referring now to FIG. 15, a gas turbine engine 20 in accordance with another exemplary aspect of the present disclosure is provided. The exemplary gas turbine engine of FIG. 15 is configured in a similar manner as the exemplary gas turbine engine 20 described above with reference to FIGS. 2 and 3. Accordingly, the exemplary gas turbine engine 20 of FIG. 15 is configured as a ducted gas turbine engine (i.e., includes a fan 52 with a nacelle 66 enclosing the fan 52). The same or similar numbers may refer to the same or similar parts.

For example, the gas turbine engine 20 generally includes a includes a fan section 24 and a turbomachine 26 disposed downstream from the fan section 24. The exemplary turbomachine 26 depicted generally includes an engine casing or core cowl 28 that defines an annular core inlet 30. The core cowl 28 at least partially encases, in serial flow relationship, a compressor section including a booster or low-pressure compressor 32 and a high-pressure compressor 34, a combustion section 36, a turbine section including a high-pressure turbine 38 and a low-pressure turbine 40, and at least a portion of a jet exhaust nozzle 42. Together, these components or sections make up a core engine 44 of the turbomachine 26.

A high-pressure shaft 46 drivingly connects the high-pressure turbine 38 to the high-pressure compressor 34. A low-pressure shaft 48 drivingly connects the low-pressure turbine 40 to the low-pressure compressor 32. The compressor section, combustion section 36, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a spaced apart manner. As depicted, the fan blades 54 extend outwardly from disk 56 generally along the radial direction R. The fan blades 54 are rotatable about the longitudinal centerline 22 by the low-pressure shaft 48.

In an exemplary embodiment, as shown in FIG. 15, the gas turbine engine 20 further includes a gearbox 60. The gearbox 60 includes a plurality of gears for adjusting a rotational speed of the fan 52 relative to a rotational speed of the low-pressure shaft 48, such that the fan 52 and the low-pressure shaft 48 may rotate at more efficient relative speeds. The gearbox 60 may be any type of gearbox suitable to facilitate coupling the low-pressure shaft 48 to the fan 52 while allowing each of the low-pressure turbine 40 and the fan 52 to operate at a desired speed. For example, in some embodiments, the gearbox 60 may be a reduction gearbox.

More specifically, in some embodiments, the gearbox 60 may define a gear ratio of the input rotational speed (e.g., the low-pressure shaft 48) to the output rotational speed greater than 3 and less than 14. For example, in certain exemplary embodiments, the gearbox 60 may define a gear ratio greater than 4, such as greater than 5, such as greater than 6 and less than 12, such as less than 11. Inclusion of the gearbox 60 with a relatively high gear ratio may allow for a relatively high diameter fan 52 in combination with a relatively high speed low-pressure turbine 40.

As will also be appreciated, the gas turbine engine 20 defines an under-core cowl axial length (L1) along an axial direction A. More specifically, the gas turbine engine 20 includes a high-pressure compressor inlet guide vane 35 having a leading edge (not labeled), where the under-core cowl axial length (L1) is measured along the axial direction A from the leading edge of the high-pressure compressor inlet guide vane 35 to a trailing edge 230 of a strut 228 extending through the exhaust nozzle 42 (which may be a strut of a turbine rear frame). The under-core cowl axial length (L1) is therefore generally a measure along the axial direction A from the high-pressure compressor 34 to the exhaust of the gas turbine engine 20.

Further, the gas turbine engine 20 defines an initial compression axial length (L2) along the axial direction A. The initial compression axial length (L2) is measured along the axial direction A from a splitter 31 positioned at the inlet 30 of the turbomachine 26 to the leading edge of the high-pressure compressor inlet guide vane 35. In the embodiment depicted, the low-pressure compressor 32 is located downstream of the splitter 31 and upstream of the leading edge of the high-pressure compressor inlet guide vane 35 (and is the only compressor within this axial location).

It will be appreciated, however, that in other exemplary embodiments, the compressor section may have one or more intermediate stages of compression (e.g., an intermediate-pressure compressor in addition to the low-pressure compressor 32).

Further, it will be appreciated that the exemplary gas turbine engine 20 depicted in FIG. 15 may be configured as a narrow-body engine (i.e., an engine configured to provide thrust to a narrow-body aircraft). In such a manner, the gas turbine engine 20 may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions.

It will be appreciated that although the description of the under-core cowl axial length (L1) and the initial compression axial length (L2) is described above with reference to the gas turbine engine 20 of FIG. 15 (which includes a speed reduction device, i.e., reduction gearbox 60, for transmitting shaft power to the main or primary fan, a nacelle 66 enclosing fan 52; and is a two stream engine, i.e., includes a bypass airflow passage 72 and a working gas flowpath 50, but not a third stream), in other embodiments, aspects of the present disclosure may be applied to other suitable gas turbine engines. For example, in other embodiments, the aspects described herein with respect to the under-core cowl axial length (L1) and the initial compression axial length (L2) (and the ICLR, as defined below), may apply to an unducted gas turbine engine (i.e., does not include a nacelle surrounding the primary fan; see, e.g., FIG. 4), a three stream gas turbine engine (i.e., includes a third stream; see, e.g., FIG. 4), etc. Notably, when applied to a three stream gas turbine engine, the under-core cowl axial length (L1) may be defined from a splitter at an upstream-most inlet to a ducted portion of the engine, downstream of the primary fan (e.g., the splitter at the engine inlet 182 in FIG. 4) to the leading edge of the high-pressure compressor inlet guide vane 35.

As will be appreciated from the description herein, the inventors further discovered, unexpectedly, during the course of designing high bypass gas turbine engines (i.e., bypass ratio above 12) having a variety of turbomachine characteristics, a significant relationship exist in a ratio of the initial compression axial length (L2) to the under-core cowl axial length (L1). This ratio, referred to herein as an initial compression length ratio (ICLR), reflects a space available for packaging, including the portion of the under-cowl space available for locating more temperature-sensitive components for engines, and accounting for the less space available because the fan duct size and space typically chosen for storing accessories and power or communications equipment is limited or no longer available (as bypass ratio increases, the weight and drag associated with the fan duct correspondingly increases in size so as to becomes too prohibitive unless the fan duct storage volume is reduced in size, mitigating the drag and weight associated with the higher bypass area).

In some embodiments, when combined with the CDR, it was unexpectedly found that an undercowl space was discovered that best balanced the need for accommodating a high-pressure compressor having 9, 10 or 11 stages; or a high-pressure compressor having less than 8 stages combined with a low-pressure compressor (or booster) having 4, 5 or 6 stages, while meeting a need for reducing a drag profile or skin friction of the engine casing as much as possible. In other embodiments, it was unexpectedly found that an undercowl space was discovered that best balanced the need for accommodating a low-pressure turbine having 4, 5 or 6 stages while balancing the need for reducing a drag profile or skin friction of the engine casing as much as possible. Importantly, in each of these examples the CDR and ICLR values also account for the packaging needed in the casing for components that may no longer be stored in the fan nacelle or when the fan nacelle is no longer present (e.g., as discussed earlier in connection with the open fan).

Compared to more traditional turbofan engines that have a relatively low diameter fan that rotate relatively quickly as a result of being driven directly from a low-pressure turbine of the turbofan engine (i.e., without a reduction gearbox), the inventors have found that by using a higher diameter fan driven through a reduction gearbox, the under-core cowl length (L1) may be reduced. In particular, such allows the primary fan to rotate at a lower angular rate relative to the low-pressure turbine, which efficiency can increase by rotating at a higher rate while maintaining a desired tip speed of the fan. Higher speeds of the low-pressure turbine may allow for less stages while extracting the same (or greater) amount of power. The lower speeds of the fan may allow for the fan to increase in diameter, which leads to a higher bypass ratio and lowered specific fuel consumption.

However, reduction of L1 may impose additional stress on high-pressure components (e.g., the high-pressure compressor and a high-pressure turbine). In particular, increases in initial compression length ratio (ICLR) may generally require the overall compressor ratio to be increased, which generally results in higher temperatures and pressures at an exit of the high-pressure compressor and at an inlet to the high-pressure turbine. Accordingly, increasing the initial compression length ratio (ICLR) too much may create an undesirable amount of stress (and premature wear) on the gas turbine engine.

In addition to yielding an improved turbofan engine, as explained in detail above, utilizing this relationship, the inventors found that the number of suitable or feasible turbofan engine designs capable of meeting both the propulsive efficiency requirements and limited stress and wear requirements could be greatly diminished, facilitating a more rapid down selection of designs to consider as a turbofan engine is being developed. Such a benefit provides more insight to the requirements for a given turbofan engine well before specific technologies, integration and system requirements are developed fully. Such a benefit avoids late-stage redesign.

The desired relationships providing for the improved turbofan engine, discovered by the inventors, are expressed as:

$$ICLR = L2/L1 \qquad (3)$$

where ICLR is a ratio of the initial compression axial length (L2) to the under-core cowl axial length (L1).

Figure 16:
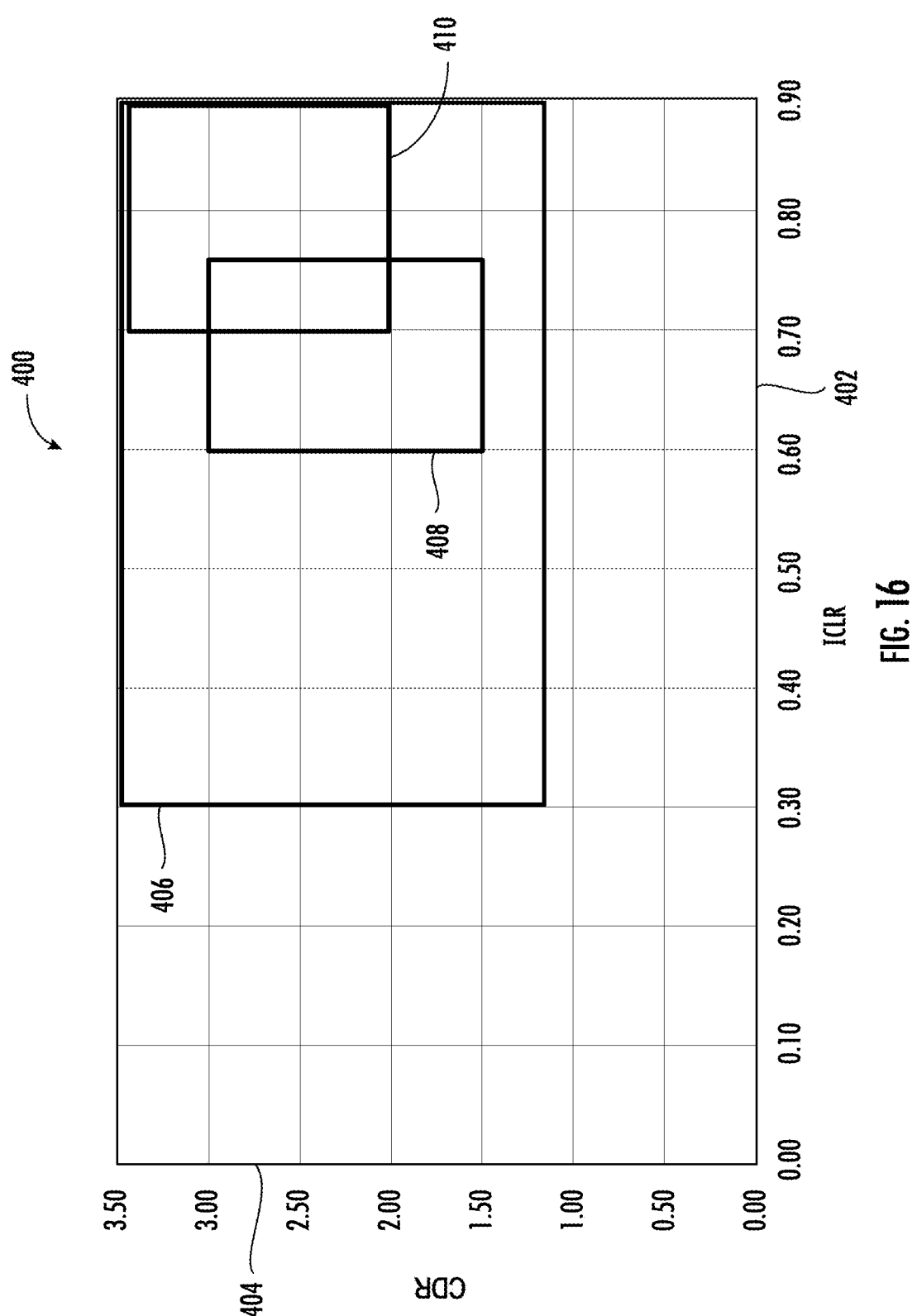
FIG. 16 is a graphical representation illustrating initial compression length ratio (ICLR) values for gas turbine engines in accordance with various exemplary embodiments of the present disclosure.

FIG. 16 is a plot 400 illustrating ICLR values, and more specifically, illustrating ICLR values along an X-axis 402 and CDR (Core Cowl Diameter Ratio) along the Y-axis 404. The plot 400 depicts an area 406 of ICLR values of a gas turbine engine in accordance with one or more aspects of the present disclosure where the gas turbine engine would provide desirable propulsive efficiency without overly stressing and wearing the gas turbine engine. The area 405 reflects ICLR values greater than or equal to 0.3 and less than or equal to 0.9, with CDR values greater than or equal to 1.24 and less than or equal to 3.5.

Referring still to the plot 400 of FIG. 16, the plot 400 further defines an area 408 of ICLR values of a gas turbine engine in accordance with one or more additional aspects of the present disclosure. The area 408 reflects ICLR values greater than or equal to 0.60 and less than or equal to 0.75, with CDR values greater than or equal to 1.5 and less than or equal to 3.0. The gas turbine engines of the present disclosure falling within the area 408 may be two stream turbofan engines (i.e., turbofan engines without a third stream), ducted turbofan engines, or both. As will be appreciated, two stream turbofan engines may not require as large of an initial compression axial length L2, and similarly ducted turbofan engines may be limited in maximum fan diameter (which as will be appreciated from the discussion above may similarly limit the ICLR). The exemplary gas turbine engine of FIG. 15 defines an ICLR and CDR within the area 408.

Referring still to the plot 400 of FIG. 16, the plot 400 further defines an area 410 of ICLR values of a gas turbine engine in accordance with one or more further aspects of the present disclosure. The area 410 reflects ICLR values greater than or equal to 0.70 and less than or equal to 0.89, with CDR values greater than or equal to 2.0 and less than or equal to 3.4. The gas turbine engines of the present disclosure falling within the area 410 may be three stream turbofan engines (i.e., turbofan engines including a third stream, such as the turbofan engines of FIGS. 4, 6, 8 and 9 having fan ducts 172), unducted turbofan engines, or both. As will be appreciated, three stream turbofan engines may include a larger initial compression axial length L2 (e.g., by virtue of the mid-fan), and similarly unducted turbofan engines may include a fan with a larger fan diameter (which as will be appreciated from the discussion above may allow for an increase in the ICLR). The exemplary gas turbine engine of FIG. 4 defines an ICLR and CDR within the area 410.

Notably, the above areas 406, 408, 410 may more specifically be directed to narrow-body engines. In such a manner, the gas turbine engines within these ranges may be configured to generate at least 18,000 pounds of thrust and less than 80,000 pounds of thrust during operation at a rated speed during standard day operating conditions, such as between 25,000 and 60,000 pounds of thrust during operation at a rated speed during standard day operating conditions, such as between 25,000 and 50,000 pounds of thrust during operation at a rated speed during standard day operating conditions. As will be appreciated, as an engine extends outside of this thrust class, a relationship of fan diameter, fan speed, high-pressure compressor size, and/or low-pressure turbine size may interact differently, such that the areas of ICLR values may not as readily capture desired gas turbine engines.

Another example of an unducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low-pressure shaft coupled to a low-pressure turbine). In some embodiments, a gear ratio of the input rotational speed to the output rotational speed is between 3.0 and 4.0, between 3.2 and 3.5, or between 3.5 and 4.5 (inclusive of the endpoints). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low-pressure compressor may include 1 to 8 stages, a high-pressure compressor may include 4 to 15 stages, a high-pressure turbine may include 1 to 2 stages, and/or a low-pressure turbine (LPT) may include 1 to 7 stages. In particular, the LPT may have 4 stages, or between 4 and 7 stages. For example, in certain embodiments, an engine may include a one stage low-pressure compressor, an 11-stage high-pressure compressor, a two-stage high-pressure turbine, and 4 stages, or between 4 and 7 stages for the LPT. As another example, an engine can include a three-stage low-pressure compressor, a 10-stage high-pressure compressor, a two stage high-pressure turbine, and a 7 stage low-pressure turbine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (D) of the engine, L/D of the engine, desired cruise altitude, and/or desired operating cruise speed, or combinations thereof.

As noted above, removing the outer nacelle and reducing the overall axial length of the core engine reduces engine weight and increases propulsive efficiency but significantly reduces engine accessory storage space. While a diameter of a core cowl may be increased to make room for the accessories between an engine casing and an inner surface of the core cowl, the core cowl diameter cannot be too large due to potential performance penalties such as excessive drag and installation difficulties. Further, positioning accessories in the hot section of the engine (e.g., with the engine core (HP compressor, combustor, and HP turbine) under the core cowl) results in exposure of the accessories to heat from the engine. This heat can weaken or damage the accessories and/or reduce their efficiency.

As such, there is a need for a cooling mechanism to enable accessories to be mounted under the core cowl while maintaining a proper temperature for operation. As described above, one of the components that can be located under the core cowl is a heat exchanger. In certain exemplary embodiments, the heat exchanger is an air cycle system, which can heat fuel as well as cool components, such as accessories, under the core cowl of the engine. Cool air provided by the air cycle system enables mounting of temperature-sensitive components in the hot section of the engine, thus better distributing external components and decreasing external dimensions. The air cycle system enables hardware to be tightly mounted under the cowl by providing cooling to particular areas under the cowl. This distribution of components under the core cowl maintains the weight-reduction and efficiency increase described above and enables the CDR and CLR to be maintained.

For example, providing an air cycle system under the core cowl enables the engine controller to be positioned closer to other components under the core cowl, rather than the outward positioning described above, while maintaining a temperature of the engine controller below a maximum threshold for the electronics of the engine controller (e.g., below 200 degrees Fahrenheit). Other engine components, such as an oil pump, power electronics, other electronics, an electric machine, a motor, an actuator, a valve, a heat exchanger, a sensor, a controller, a pump, a duct, fire and overheat detection system components, fire extinguisher components, a generator, etc., can be positioned under the core cowl and cooling using the air cycle system as described further below.

In certain embodiments, an aircraft thermal management system incorporates a thermal bus architecture that retrieves thermal energy from various heat sources (e.g., lube oil, precooler, cooled cooling air, intercooler, etc.) and sinks to a high-temperature fuel. The thermal bus is then cooled by an air cycle system driven by the compressor bleed to eliminate fan duct exchangers. The air cycle system can be implemented under the cowl 220 of the open fan engine 100, for example.

Figure 17:
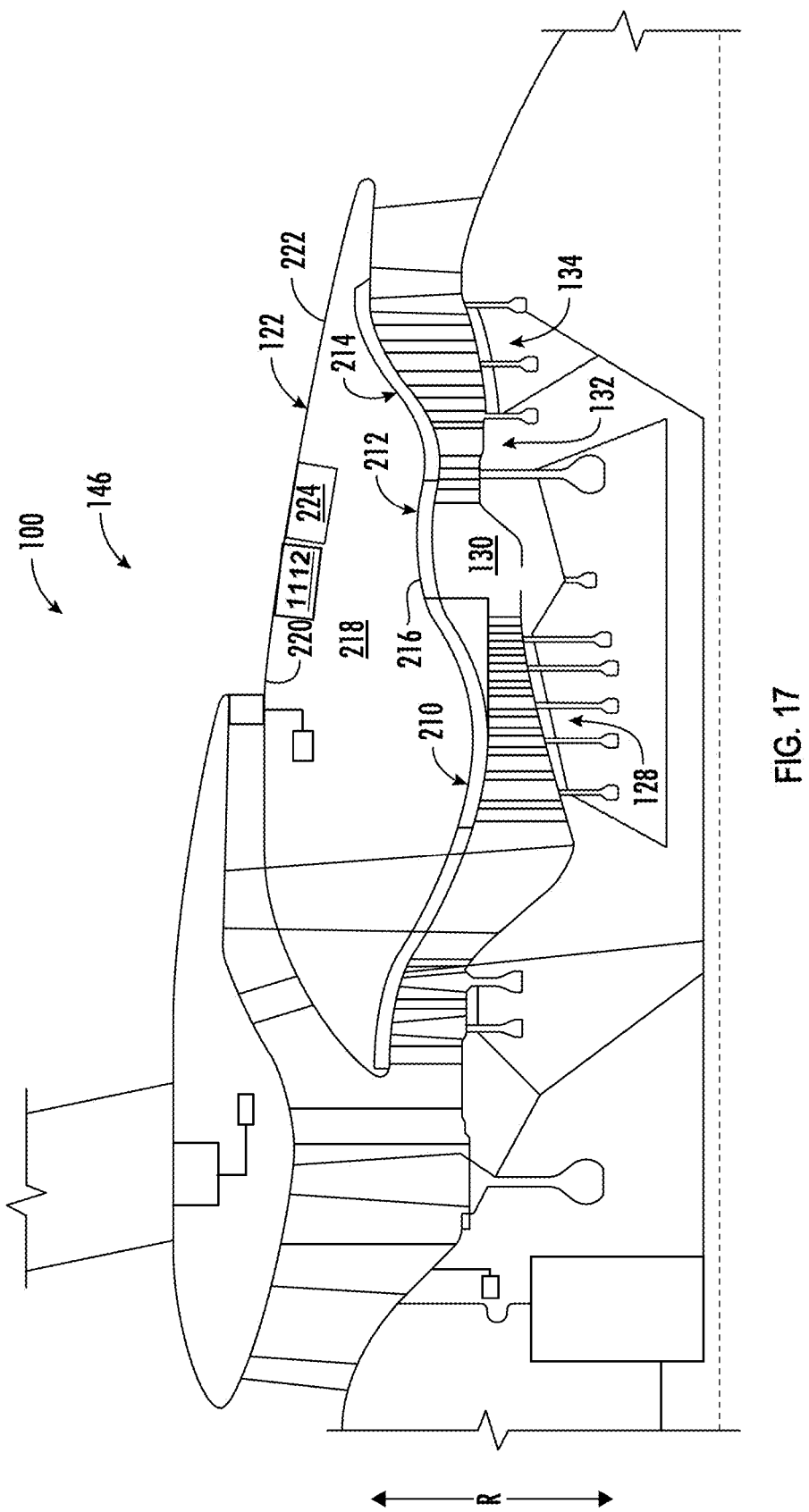
FIG. 17 is a schematic, cross-sectional view of an exemplary gas turbine engine according to various exemplary embodiments of the present disclosure.

Referring now to FIG. 17, the gas turbine engine 100 can include an air cycle assembly 1112 for cooling of one or more engine components under the cowl 220. By positioning the air cycle assembly 1112 under the cowl 220, the engine can be more compact, with components arranged under the cowl 220, while still managing the temperature of the components in a heated environment. Traditionally, arranging components under the core cowl 220 is limited due to temperature control, the air cycle assembly 1112, described further below, enables component cooling of components, such as oil pump, power electronics, electric machine, motors, actuators, valves, control electronics (e.g., FADEC, etc.,), etc., within the confines of the core cowl 220. Alternatively or additionally, the air cycle assembly 1112 can be mounted on a pylon, the bypass airflow passage 72, etc.

Figure 18:
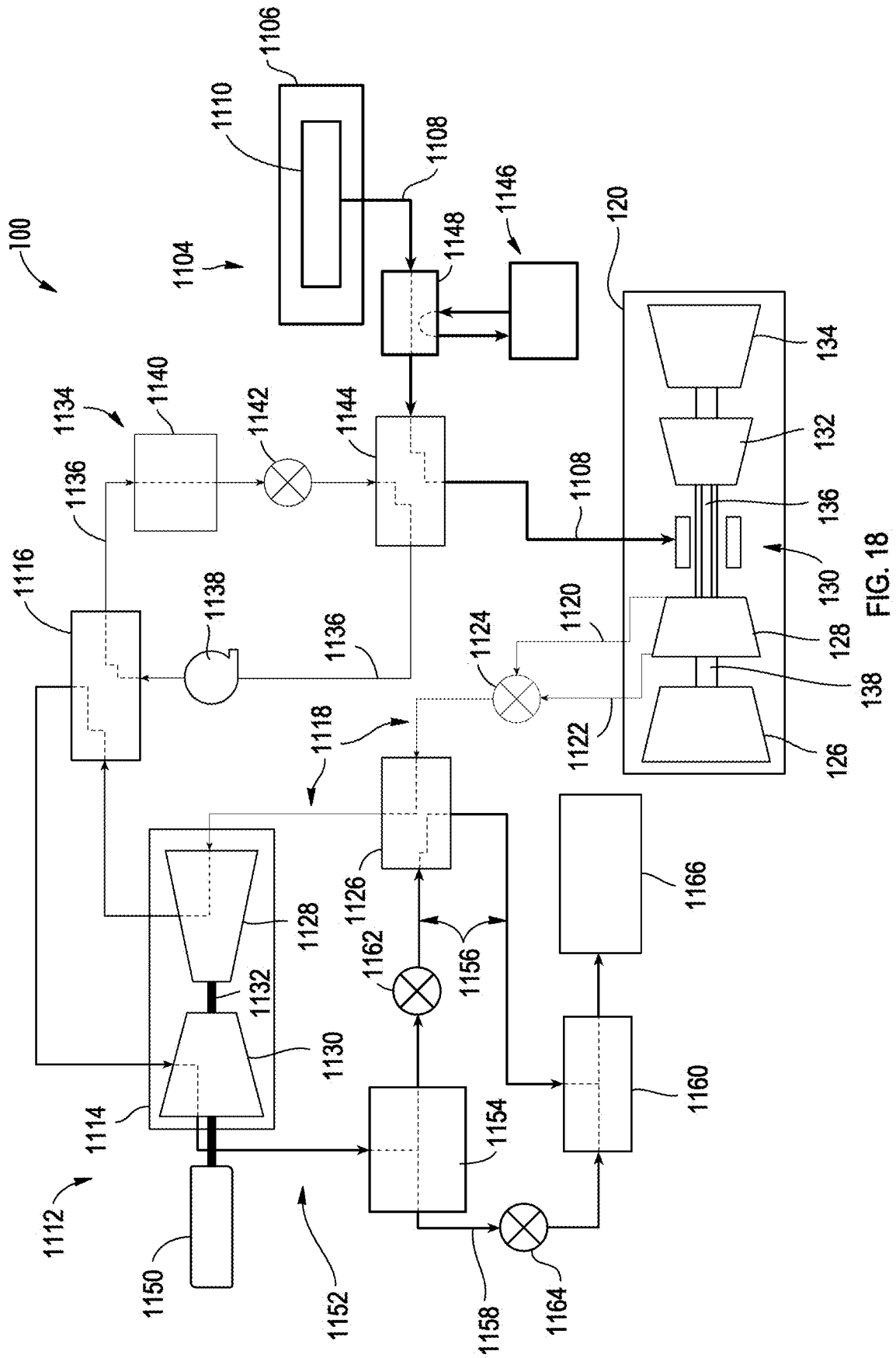
FIG. 18 is a schematic, flow diagram of a gas turbine engine assembly in accordance with an exemplary embodiment of the present disclosure.

FIG. 18 is a schematic, flow diagram of the gas turbine engine 100 in accordance with an exemplary embodiment of the present disclosure. The exemplary gas turbine engine 100 of FIG. 18 may be configured in substantially the same manner as exemplary gas turbine engine assembly described above. For example, the exemplary gas turbine engine assembly 100 generally includes a gas turbine engine having a turbomachine 120. The gas turbine engine may be, for example, an open fan or unducted engine.

For example, the gas turbine engine may be configured in a similar manner as the gas turbine engine 100 described above. Accordingly, the gas turbine engine 100 of FIG. 18 may generally include, as noted, the turbomachine 120 having a compressor section having an LP compressor 126 and an HP compressor 128; a combustion section 130; and a turbine section including an HP turbine 132 and an LP turbine 134. The compressor section, combustion section 130, and turbine section are arranged in serial flow order. An HP shaft or spool 136 drivingly connects the HP turbine 132 to the HP compressor 128, and an LP shaft or spool 138 drivingly connects the LP turbine 134 to the LP compressor 126.

Further, the exemplary gas turbine engine 100 of FIG. 18 includes a fuel delivery system 1104 operable with the combustion section 130 of the turbomachine 120 of the exemplary gas turbine engine 100 to provide fuel to the combustion section 130 of the turbomachine 120 of the exemplary gas turbine engine. For the embodiment depicted in the example of FIG. 18, the fuel delivery system 1104 generally includes a high temperature fuel source 1106 and a plurality of fuel lines 1108, the plurality of fuel lines 1108 transporting fuel from the high temperature fuel source 1106 to the combustion section 130 of the turbomachine 120. The high temperature fuel source 1106 includes an oxygen reduction unit 1110 to reduce a level of oxygen within the fuel to minimize a risk of the fuel coking when the fuel is exposed to relatively high temperatures, as will be discussed in greater detail below. The oxygen reduction unit 1110 may be, e.g., a fuel deoxygenation unit, a fuel oxygen conversion unit, or other systems or structures performing such function. Although not depicted in FIG. 18, the oxygen reduction unit 1110 may receive a fuel flow from one or more fuel tanks of an aircraft including the gas turbine engine assembly 100, and provide the fuel flow to the plurality of fuel lines 1108.

Referring still to FIG. 18, the exemplary gas turbine engine assembly 100 further includes the air cycle assembly 1112. The air cycle assembly 1112 generally includes an air cycle machine 1114 and an air cycle system ("ACS") heat exchanger 1116. The air cycle machine 1114 is in airflow communication with the compressor section of the turbomachine 120 and the ACS heat exchanger 1116 is, in turn, in airflow communication with the air cycle machine 1114. As noted above, the air cycle assembly 1112 and fuel delivery system 1104 can be positioned under the cowl 220 to facilitate cooling of components within the compact engine core 146.

For the embodiment depicted in FIG. 18, the exemplary air cycle assembly 1112 includes a bleed airflow line 1118 in airflow communication with the compressor section of the turbomachine 120 of the exemplary gas turbine engine. More specifically, the bleed airflow line 1118 is in airflow communication with the HP compressor 128, and, more specifically still, includes a first portion 1120 in airflow communication with a high-pressure end of the HP compressor 128 and a second portion 1122 in airflow communication with a low pressure end of the HP compressor 128. For example, the first portion 1120 may be configured to receive a bleed airflow from a downstream stage of the HP compressor 128 at a relatively high pressure, and the second portion 1122 may be configured to receive a bleed airflow from an upstream stage of the HP compressor 128 at a relatively low pressure. It will be appreciated that, typically, the air cycle assembly 1112 requires a certain driving pressure from the bleed airflow received through the bleed airflow line 1118. For example, while it is generally preferable to take the bleed airflow from the upstream/low-pressure stage of the HP compressor 128 for efficiency purposes, such may not be practical during all operating conditions of the turbomachine 120. Accordingly, bleed airflow may be taken, for example, from the downstream stage of the HP compressor 128 (i.e., a high pressure stage) during low power conditions, and from the upstream stage of the HP compressor 128 (i.e., a low pressure stage) during high power conditions.

The first portion 1120 and the second portion 1122 of the bleed airflow line 1118 meet at a three-way valve 1124, also referred to as a bleed port switching valve, of the bleed airflow line 1118, where bleed airflow from the first portion 1120 and the second portion 1122 are merged. The three-way valve 1124 may be a variable valve operably connected to, e.g., a controller (such as the FADEC, not shown in FIG. 18) of the gas turbine engine to control a pressure of the bleed airflow provided to the air cycle machine 1114 through the bleed airflow line 1118. Notably, although not depicted in FIG. 18, a pressure regulator and/or emergency shut-off valve may additionally be provided in the bleed airflow line 1118 to help ensure that an over-pressure and/or over-temperature event does not damage the air cycle assembly 1112.

It will be appreciated, however, in other exemplary embodiments, the bleed airflow line 1118 may include other structure or configuration to receive a bleed airflow from the compressor section of the turbomachine 120.

For the embodiment depicted in FIG. 18, the air cycle assembly 1112 further includes an ACS pre-cooler 1126. The bleed airflow line 1118 is in airflow communication with the ACS pre-cooler 1126 at a location upstream of the air cycle machine 1114. As will be explained in more detail below, the ACS pre-cooler 1126 can provide an initial amount of cooling to the bleed airflow that is provided to the air cycle machine 1114 through the bleed airflow line 1118. It will be appreciated, however, that in other embodiments, the air cycle assembly 1112 may not include the ACS pre-cooler 1126, or another ACS pre-cooler 1126 configuration may be provided.

The bleed airflow line 1118 then provides the bleed airflow to the air cycle machine 1114. As is depicted in the example of FIG. 18, the exemplary air cycle machine 1114 of FIG. 18 generally includes a compressor 1128 for receiving and compressing the bleed airflow from the compressor section of the turbomachine 120 (i.e., through the bleed airflow line 1118) and a turbine 1130 rotatable with the compressor 1128 and positioned downstream of the compressor 1128. More specifically, the compressor 1128 is coupled to the turbine 1130 through an ACS shaft 1132. The compressor 1128 may generally compress the bleed airflow provided thereto (increasing a temperature and pressure of such bleed airflow), while the turbine 1130 of the air cycle machine 1114 may generally expand and cool the previously compressed bleed airflow from the compressor 1128.

Further, as stated above, the exemplary air cycle assembly 1112 generally includes the ACS heat exchanger 1116 in airflow communication with the air cycle machine 1114. More specifically, for the embodiment depicted in FIG. 18, the ACS heat exchanger 1116 is in airflow communication with the compressor 1128 of the air cycle machine 1114 at a location downstream of the compressor 1128 of the air cycle machine 1114, and the turbine 1130 of the air cycle machine 1114 a location upstream of the turbine 1130 of the air cycle machine 1114. As such, the bleed airflow compressed by the compressor 1128 of the air cycle machine 1114 may be provided to the ACS heat exchanger 1116, and subsequently such bleed airflow may be provided from the ACS heat exchanger 1116 to the turbine 1130 of the air cycle machine 1114.

Moreover, referring still to FIG. 18, the gas turbine engine assembly 100 further includes a thermal transfer bus 1134 to remove heat from the compressed bleed airflow through the ACS heat exchanger 1116. The exemplary thermal transfer bus 1134 thermally couples the ACS heat exchanger 1116 of the air cycle assembly 1112 to the fuel delivery system 1104.

In such a manner, the thermal transfer bus 1134 may generally transfer heat from a bleed airflow through the air cycle machine 1114, or, more particularly, through the ACS heat exchanger 1116, to the fuel delivery system 1104. Such a configuration allows the heat transfer bus 1134 to act as a buffer between the compressed bleed airflow and the flow of fuel through the fuel delivery system 1104 to reduce or eliminate the possibility of fuel and high-temperature air from mixing outside the combustion section 130 of the turbomachine 120.

As will be appreciated, compressing the bleed airflow (and increasing a temperature and pressure of such bleed airflow) prior to providing such bleed airflow to the ACS heat exchanger 1116 allows for a greater amount of heat removal from such bleed airflow, such that a lower overall temperature may be reached when the bleed airflow is subsequently expanded through the turbine 1130 of the air cycle machine 1114. More specifically, compressing the bleed airflow prior to providing such bleed airflow to the ACS heat exchanger 1116 creates a larger temperature delta between the bleed airflow and the heat exchange fluid through the thermal transfer bus 1134 to facilitate a greater heat transfer therebetween.

For the embodiment depicted in FIG. 18, the thermal transfer bus 1134 generally includes a series of conduits 1136, a pump 1138 for generating a flow of a thermal transfer fluid through the series of conduits 1136, a thermal energy storage unit 1140, a valve 1142, and a fuel heat exchanger 1144. During operation, the series of conduits 1136 provides the thermal transfer fluid through the ACS heat exchanger 1116, wherein the thermal transfer fluid accepts heat from the bypass airflow through the ACS heat exchanger 1116. The heated thermal transfer fluid then flows through the thermal energy storage unit 1140, wherein thermal energy may be stored during at least certain operations. For example, during certain operations, the thermal energy storage unit 1140 may include an energy storage medium, such as a wax, liquid metal, molten salt, fusible alloy, etc. to absorb thermal energy and later release such thermal energy on-demand. For example, the thermal energy storage unit 1140 may store heat during operation and subsequently release it during, e.g., conditions where the air cycle assembly 1112 does not generate a desired amount of heat. Notably, however, in other exemplary embodiments, the thermal transfer bus 1134 may not include the thermal energy storage unit 1140.

Referring still to the embodiment of FIG. 18, the thermal transfer fluid may then flow through the valve 1142 and to, and through, the fuel heat exchanger 1144. Within the fuel heat exchanger 1144, the thermal transfer fluid may provide heat to a flow of fuel provided therethrough from the fuel delivery system 1104 (and more specifically from the fuel lines 1108). In such a manner, the thermal transfer bus 1134 may transfer heat from the air cycle machine 1114 to the fuel delivery system 1104. It will be appreciated that increasing a temperature of the fuel flow provided to the combustion section 130 of the turbomachine 120 may generally result in an overall more efficient operation of the turbomachine 120, while enabling accessories and other components to be positioned under the core cowl 220 with respect to the turbomachine 120 at an acceptable operating temperature, rather than overheating.

It will be appreciated that for the embodiment depicted, the thermal transfer bus 1134 utilizes a single phase heat transfer fluid during operation. More specifically, during operation of the gas turbine engine assembly 100, substantially all of the thermal transfer fluid through the thermal transfer bus 1134 remains in a single phase (such as a liquid phase, a gas phase, or supercritical phase). However, in other embodiments, the thermal transfer bus 1134 may instead utilize a phase change fluid configured to change phases during operation.

Notably, for the exemplary embodiment depicted in FIG. 18, the fuel delivery system 1104 is also thermally coupled to a lubrication system 1146 of the gas turbine engine assembly 100. The lubrication system 1146 may be an oil lubrication system for a plurality of bearings within the gas turbine engine (not shown). As is also depicted, the fuel delivery system 1104 further includes a fuel cooled oil cooler 1148 at a location upstream of the fuel heat exchanger 1144. The fuel cooled oil cooler 1148 thermally couples the lubrication system 1146 to the fuel flow through the fuel delivery system 1104, such that the fuel flow through the fuel delivery system 1104 may accept heat from the lubrication system 1146 to reduce a temperature of a lubrication oil of the lubrication system 1146, and increase a temperature of the fuel flow through the fuel delivery system 1104 (and more specifically, fuel lines 1108).

Referring now back to the air cycle assembly 1112 of the exemplary gas turbine engine assembly 100 of FIG. 18, it will be appreciated that the exemplary air cycle machine 1114 depicted is further mechanically coupled to an electric machine. More specifically, the electric machine is configured as a starter motor/generator 1150. Such a manner, the starter motor/generator 1150 may be operable to start the air cycle machine 1114 during, e.g., starting operations of the gas turbine engine assembly 100, wherein a bleed airflow from the gas turbine engine may be below an amount required to drive the air cycle machine 1114. In other operations, however, the amount of bleed airflow extracted from the gas turbine engine may exceed the amount required to drive the air cycle machine 1114. In such exemplary aspects, the air cycle machine 1114 may instead drive the starter motor/generator 1150, such that the exemplary starter motor/generator 1150 generates excess electrical power, which may be utilized in any suitable manner.

Moreover, as previously described, the bleed airflow provided to the air cycle machine 1114 (through bleed line 1118) is expanded and cooled through the turbine 1130 of the air cycle machine 1114, subsequent to being compressed by compressor 1128 and cooled by ACS heat exchanger 1116. This expansion generates the mechanical power for driving the air cycle machine 1114. The expanded and cooled bleed airflow from the turbine 1130 of the air cycle machine 1114 is then provided through an outlet duct assembly 1152. For the exemplary embodiment depicted, the air cycle assembly 1112 further includes a thermal energy storage unit 1154 in airflow communication with air cycle machine 1114 at a location downstream of the air cycle machine 1114. More specifically, the thermal energy storage unit 1154 is in airflow communication with the air cycle machine 1114 through the outlet duct assembly 1152. The exemplary thermal energy storage unit 1154 may include any suitable configuration for storing thermal energy. For example, in certain embodiments, the thermal energy storage unit 1154 may include a phase change material, such as a mass of metal molten salt, liquid metal, wax, compressed gas, etc. The thermal energy storage unit 1154 may store energy in the form of this cooled material during operation and subsequently release it when the air cycle machine 1114 is not providing a cooled airflow (or a desired amount of cooled airflow). For example, the thermal energy storage unit 1154 may release the cooled material to generate a cooled airflow during a shutdown of the turbomachine 120 to reduce a risk of a bowed rotor condition.

Referring still to the embodiment of FIG. 18, from the thermal energy storage unit 1154 the cooled bleed airflow may be provided through a first path 1156 or a second path 1158 of the exemplary outlet duct assembly 1152. The first path 1156 provides the cooled bleed airflow to and through the ACS pre-cooler 1126. As noted above, the ACS pre-cooler 1126, which is an air-to-air heat exchanger for the embodiment depicted, may transfer heat from the bleed airflow from the compressor section of the turbomachine 120 (i.e., through line 1118) to the cooled airflow from the air cycle machine 1114 through the first path 1156. Therefore, the ACS pre-cooler 1126 may cool the bleed airflow through line 1118 prior to such bleed airflow being provided to the air cycle machine 1114. The cooled airflow through the first path 1156 (having accepted some heat through the ACS pre-cooler 1126) is then provided to a mixing chamber 1160 of the air cycle assembly 1112. By contrast, the second path 1158 extends directly from the thermal energy storage unit 1154 to the mixing chamber 1160.

Further, for the exemplary embodiment depicted in FIG. 18, the air cycle assembly 1112 further includes a first valve 1162 positioned within the first path 1156 of the outlet duct assembly 1152 and a second valve 1164 positioned within the second path 1158 of the outlet duct assembly 1152. The first valve 1162 and second valve 1164 may each be variable throughput valves to vary an amount of airflow allowable through the first path 1156 and the second path 1158, respectively. Notably, however, in other embodiments, the air cycle assembly 1112 may not include one of the first valve 1162 or second valve 1164, or alternatively, may include a variable, three-way valve at a juncture between the first path 1156 and second path 1158 (within the unit 1154 for the embodiment shown). For example, in other embodiments, the air cycle assembly 1112 may not include the thermal energy storage unit 1154, and instead may include a variable throughput three-way valve.

Moreover, within the mixing chamber 1160 the cooled bleed airflow from the first path 1156 and the cooled bleed airflow from the second path 1158 may be mixed back together and provided to a heat sink 1166. The heat sink 1166 may be any suitable heat sink 166 of the exemplary gas turbine engine and/or an aircraft including the exemplary gas turbine engine. For example, in certain exemplary embodiments, the heat sink 1166 may be one or more of a cooled compressor air system, a heat sink for the low pressure turbine or other turbine components, may be a sump (such that the airflow is utilized for sump cooling), may be an environmental control system or other aircraft heat load, etc.

Figure 19:
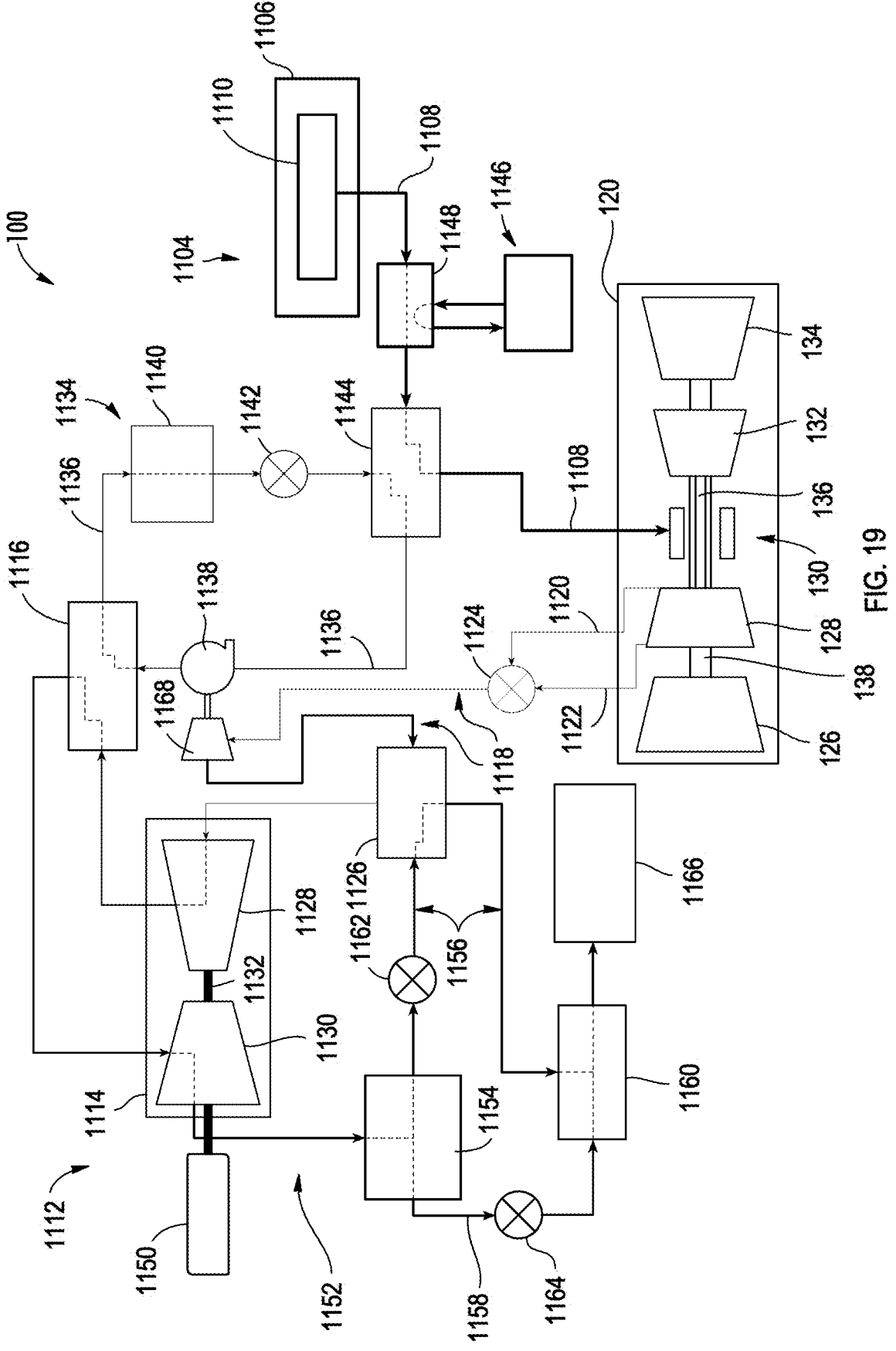
FIG. 19 is a schematic, flow diagram of the gas turbine engine assembly in accordance with another exemplary embodiment of the present disclosure.
Figure 20:
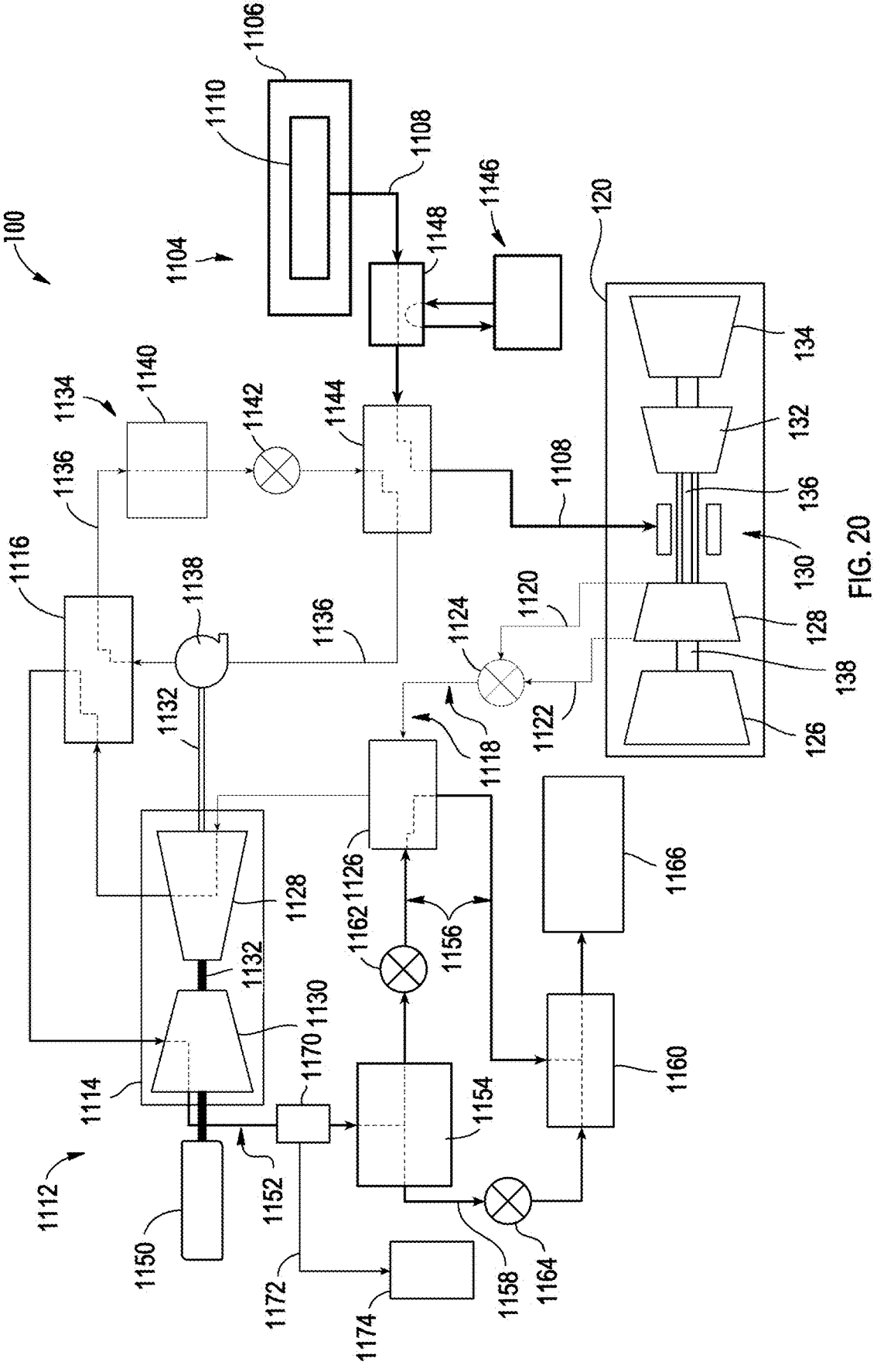
FIG. 20 is a schematic, flow diagram of the gas turbine engine assembly in accordance with yet another exemplary embodiment of the present disclosure.

It will be appreciated, however, that in other exemplary embodiments, the exemplary gas turbine engine assembly 100 may instead have another configuration. For example, referring now to FIGS. 19 and 20, two other embodiments of a gas turbine engine assembly 100 in accordance with other exemplary embodiments are provided. Each of the embodiments of FIGS. 19 and 20 are configured in substantially the same manner as exemplary gas turbine engine assembly 100 described above with reference to FIG. 18. For example, the exemplary gas turbine engine assemblies 100 of FIGS. 19 and 20 each include a gas turbine engine having a turbomachine 120, a fuel delivery system 1104, an air cycle assembly 1112, and a thermal transfer bus 1134. The thermal transfer bus 1134 is configured to thermally couple an ACS heat exchanger 1116 of the air cycle assembly 1112 to the fuel delivery system 1104 for transferring heat from an air cycle machine 1114 of the air cycle assembly 1112 to the fuel delivery system 1104.

Moreover, the thermal transfer bus 1134 depicted in each of FIGS. 19 and 20 includes a pump 1138 for providing a flow of thermal transfer fluid through a series of conduits 1136 of the thermal transfer bus 1134. Notably, however, for the embodiments of FIGS. 19 and 20, the pump 1138 is generally powered by an aspect of the air cycle assembly 1112.

More specifically, referring particularly to FIG. 19, the pump 1138 is configured as a turbopump having a power turbine 1168 in airflow communication with a compressor section of the turbomachine 120 and a compressor 1128 of the air cycle machine 1114 at a location upstream of the compressor 1128 of the air cycle machine 1114. Moreover, for the exemplary embodiment depicted in FIG. 19, the power turbine 1168 of the turbopump is further located upstream of an ACS pre-cooler 1126 of the air cycle assembly 1112. In such a manner, the bleed airflow from the compressor section of the turbomachine 120 may flow through the power turbine 1168 of the turbopump, powering the turbopump.

Further, referring now particularly to FIG. 20, for the exemplary embodiment depicted, the pump 1138 is powered directly by the air cycle machine 1114 of the air cycle assembly 1112. More specifically, a shaft 1132 of the air cycle machine 1114, for the exemplary embodiment of FIG. 20, extends from the compressor 1128 to the pump 1138 to mechanically power, or drive, the pump 1138 of the thermal transfer bus 1134 during operation of the gas turbine engine assembly 100. Although shown as a continuous shaft 1132, in other exemplary embodiments, the shaft 1132 may instead be formed of a plurality of components.

Notably, as is also depicted in FIG. 20, the air cycle assembly 1112 of the gas turbine engine assembly 100 further includes a condensate separator 1170 located downstream of the air cycle machine 1114 and upstream of, for the exemplary embodiment depicted, a thermal energy storage unit 1154 of the air cycle assembly 1112. The condensate separator 1170 is configured to provide a subfreezing discharge to the thermal energy storage unit 1154, while separating out a dry, cold airflow. The dry, cold airflow is provided through a separate duct 1172 to a heat sink 1174 (which may be the same heat sink 166 receiving an airflow from a mixing chamber 1160 of the air cycle assembly 1112). Inclusion of the condensate separator 1170 may ensure that any subfreezing discharge (e.g., ice) is not provided to components that may be damaged by such subfreezing discharge.

Moreover, in other exemplary embodiments of the present disclosure, the gas turbine engine assembly 100 may have other suitable configurations. For example, referring now to FIGS. 21 and 22, a gas turbine engine assembly 100 in accordance with yet another exemplary embodiment of the present disclosure is provided. The exemplary gas turbine engine assembly 100 of FIGS. 21 and 22 may be configured in substantially the same manner as the exemplary gas turbine engine assembly 100 described above with reference to, e.g., FIG. 18.

Figure 22:
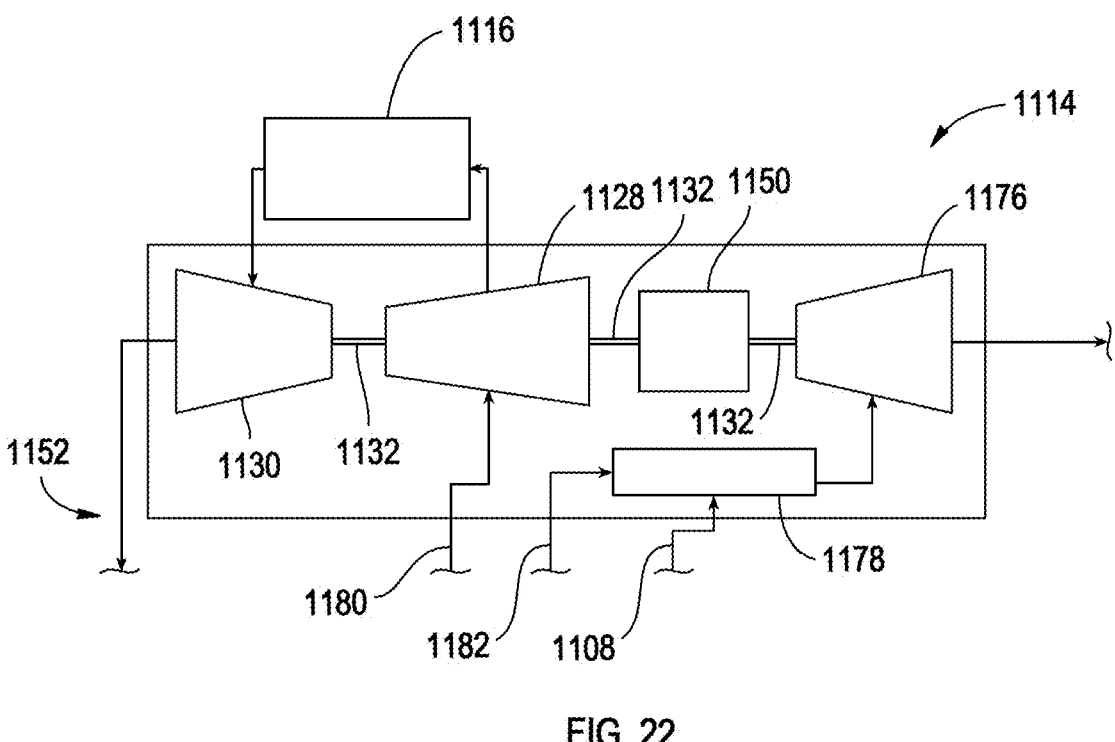
FIG. 22 is a close-up, schematic, flow diagram of an air cycle machine of the exemplary gas turbine engine assembly of FIG. 21.

For example, referring particularly to FIG. 22, providing a schematic flow diagram of the exemplary gas turbine engine assembly 100, the exemplary gas turbine engine assembly 100 generally includes a gas turbine engine having a turbomachine 120, a fuel delivery system 1104, an air cycle assembly 1112, and a thermal transfer bus 1134. The turbomachine 120 generally includes a compressor section having one or more compressors configured to provide a bleed airflow to the air cycle assembly 1112 through a bleed airflow line 1118. Additionally, the thermal transfer bus 1134 is configured to thermally couple an ACS heat exchanger 1116 of the air cycle assembly 1112 to the fuel delivery system 1104 to transfer heat from an air cycle machine 1114 of the air cycle assembly 1112 to the fuel delivery system 1104.

Figure 21:
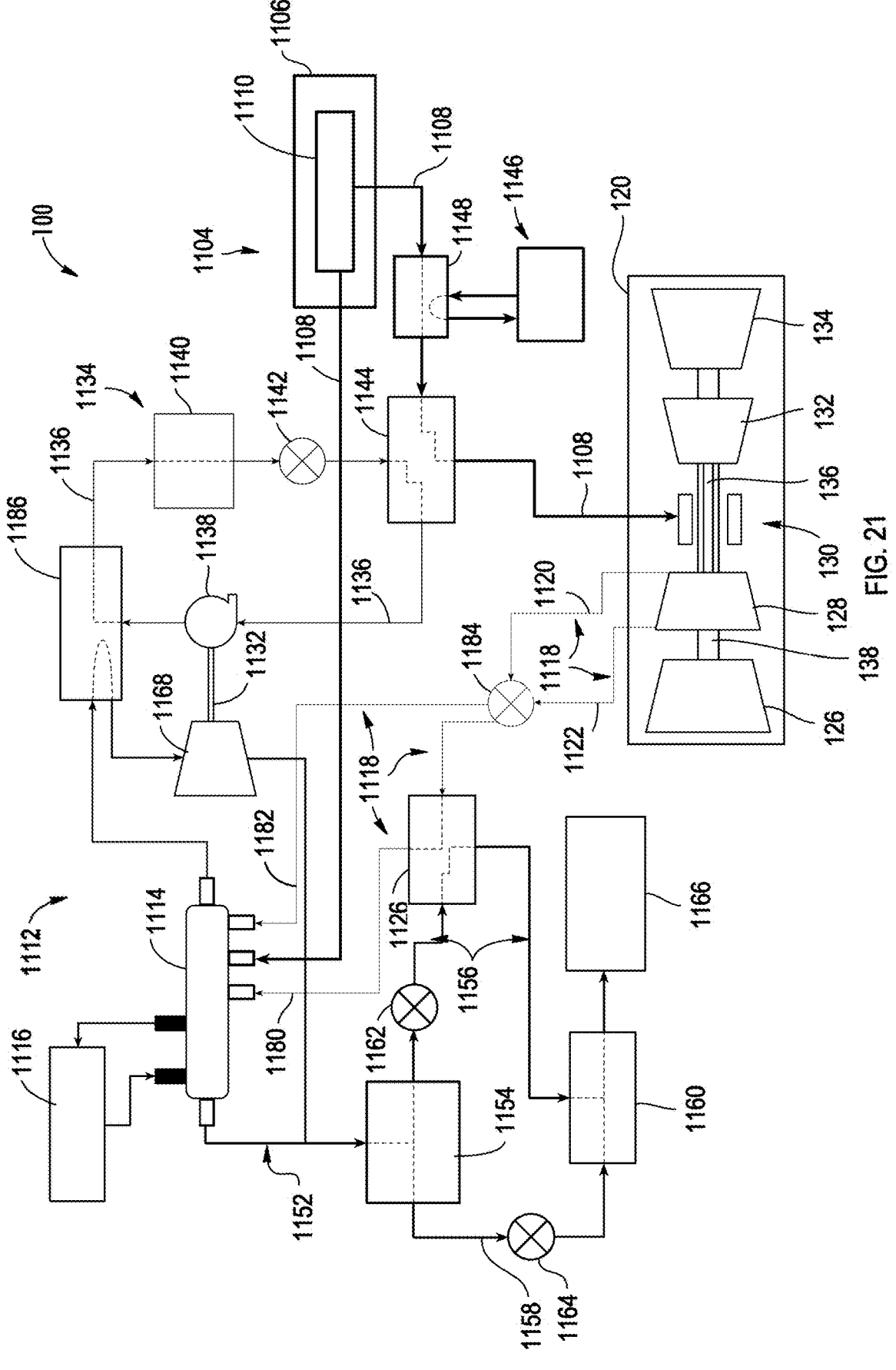
FIG. 21 is a schematic, flow diagram of the gas turbine engine assembly in accordance with still another exemplary embodiment of the present disclosure.

Moreover, the exemplary air cycle assembly 1112 of FIGS. 21 and 22 further includes the air cycle machine 1114, which is configured to receive a bleed airflow from the compressor section of the turbomachine 120 of the exemplary gas turbine engine. The exemplary air cycle machine 1114 is an "open-loop" air cycle machine 1114, similar to the embodiments described above. However, for the embodiment depicted in FIGS. 21 and 22, the air cycle machine 1114 is a "3-wheel" air cycle machine 1114 (as opposed to be "2-wheel" air cycle machines described above).

More specifically, referring particularly to FIG. 22, a close-up, schematic view of the exemplary air cycle machine 1114 is provided. The exemplary air cycle machine 1114 depicted includes a compressor 1128 and a turbine 1130. More specifically still, the turbine is a first turbine 1130, and the air cycle machine 1114 further includes a second turbine 1176, as well as a combustor 1178. The combustor 1178 is in airflow communication with the second turbine 1176 at a location upstream of the second turbine 1176. Additionally, the second turbine 1176 is rotatable with the compressor 1128 of the air cycle machine 1114 and the first turbine 1130 of the air cycle machine 1114 through a common ACS shaft 1132. It will be appreciated, however, that although for the embodiment depicted the ACS shaft 1132 is depicted schematically as a single component, in other exemplary embodiments, the ACS shaft 1132 may instead be configured as a plurality of components joined in any suitable manner. Additionally, one or more speed change mechanisms may be provided with the ACS shaft 1132 such that certain portions are rotatable at different speeds than others.

Briefly, as is also depicted, the exemplary air cycle machine 1114 of FIG. 22 further includes an electric machine (i.e., a starter motor/generator 1150 for the embodiment depicted) rotatable with, or coupled to, the ACS shaft 1132. In such a manner, the starter motor/generator 1150 may be operable to assist with starting the air cycle machine 1114 during certain operations (e.g., wherein a bleed airflow provided thereto is not sufficient to drive the air cycle machine 1114), and further may be operable to extract electrical power from the air cycle machine 1114 during other operations (e.g., wherein the bleed airflow provided thereto is more than sufficient to drive the air cycle machine 1114).

Referring now back particularly to FIG. 21, it will be appreciated that the exemplary air cycle machine 1114, or rather, the combustor 1178 of the exemplary air cycle machine 1114, is operable with the fuel delivery system 1104 to receive a fuel flow from the fuel delivery system 1104. In addition, the air cycle machine 1114 is operable to receive two separate flows of bleed airflow from the compressor section of the turbomachine 120 depicted in FIG. 22. Specifically, for the embodiment depicted, the two flows of bleed airflow are distributed between a first supply line 1180 and a second supply line 1182, separated within the bleed line 1118 via a splitter valve 1184. The first supply line 1180 provides a first flow of bleed airflow through, for the embodiment depicted, an ACS pre-cooler 1126 and to the compressor 1128 of the air cycle machine 1114. By contrast, the second supply line 1182 provides a second flow of bleed airflow to the combustor 1178 of the air cycle machine 1114.

The second flow of bleed airflow may then be mixed within the combustor 1178 with a fuel flow provided by the fuel delivery system 1104 and combusted to generate combustion gases. The combustion gases may then be provided to the second turbine 1176 of the air cycle machine 1114, which expands combustion gases and extracts energy therefrom to assist with powering the air cycle machine 1114.

As is also depicted in FIG. 21, and noted above, the air cycle assembly 1112 further includes the ACS heat exchanger. More specifically, for the embodiment depicted, the air cycle assembly 1112 includes a first ACS heat exchanger 1116 and a second ACS heat exchanger 1186. The first ACS heat exchanger 1116 is in airflow communication with the compressor 1128 and first turbine 1130 of the air cycle machine 1114, in substantially the same manner as the exemplary ACS heat exchanger 1116 described above with reference to FIG. 18. Further, the second ACS heat exchanger 1186 is in airflow communication with the second turbine 1176 to receive an exhaust flow from the second turbine 1176 of the air cycle machine 1114.

Each of the first ACS heat exchanger 1116 and second ACS heat exchanger 1186 may be operable to remove heat from a respective airflow from the air cycle machine 1114 therethrough. For the exemplary embodiment depicted in FIG. 21, the first ACS heat exchanger 1116 may be in thermal communication with, e.g., a bypass airflow passage of the gas turbine engine (such as the exemplary bypass airflow passage 72 described above with reference to FIG. 15). In such a manner, the first ACS heat exchanger 1116 may utilize the bypass airflow passage as a heat sink for the air cycle machine 1114. By contrast, the second ACS heat exchanger 1186 is thermally coupled to the thermal transfer bus 1134, such that heat may be extracted from the exhaust gas flow through the second ACS heat exchanger 1186, and then provided to the fuel delivery system 1104 (i.e., through a fuel heat exchanger 1144, as described above). It will be appreciated, however, that in other embodiments, the first ACS heat exchanger 1116 may also be thermally coupled to the thermal transfer bus 1134, or any other suitable heat sink, and further that in other embodiments, the second ACS heat exchanger 1186 may alternatively be thermally coupled to any other suitable heat sink, such as the bypass airflow passage (see FIG. 24).

Referring still to the embodiment of FIGS. 21 and 22, as with the embodiments described above, the cooled and expanded airflow from the first turbine 1130 (downstream of the first ACS heat exchanger 1116 and compressor 1128) is provided through an outlet duct assembly 1152, and, more specifically, for the embodiment depicted, provided to an ACS thermal energy storage unit 1154. The expanded in cooled airflow may then be provided either to the ACS pre-cooler 1126, by way of a path 1156, or directly to a mixing chamber 1160, by way of a path 1158, prior to being utilized for cooling a heat sink.

In addition, for the embodiment of FIGS. 21 and 22, the airflow from the second turbine 1176, cooled through the second ACS heat exchanger 1186, is utilized to drive a pump 1138 of the thermal transfer bus 1134 prior to being provided to the outlet duct assembly 1152 of the air cycle assembly 1112. More specifically, for the embodiment shown, the thermal transfer bus 1134 utilizes a turbopump having a power turbine 1168. An airflow from the second ACS heat exchanger 1186 is provided through the power turbine 1168 of the turbopump to drive the turbopump and, e.g., circulate thermal transfer fluid through the thermal transfer bus 1134. The power turbine 1168 expands the airflow therethrough, extracting energy and reducing a temperature thereof.

Although not depicted, a separate mixing chamber or valve may be utilized to join the airflow from the turbopump with the airflow from the first turbine 1130 of the air cycle machine 1114 within the outlet duct assembly 1152 at a location upstream of the thermal energy storage unit 1154. Notably, however, in other embodiments, the airflow from the turbopump may be joined with the outlet duct assembly 1152 at another location (e.g., downstream of the thermal energy storage unit 1154, at the mixing chamber 1160, etc.).

It will further be appreciated that the exemplary embodiment described with reference to FIGS. 21 and 22 is one exemplary embodiment of the present disclosure. In still other embodiments, the gas turbine engine assembly 100 may have other configurations. For example, in other exemplary embodiments, the pump 1138 of the thermal transfer bus 1134 may instead be driven directly by the air cycle machine 1114 (e.g., by the ACS shaft 1132; see, e.g., FIG. 20), or by other suitable power source. Further, in still other exemplary embodiments, airflow from the second ACS heat exchanger 1186 may not be provided to the outlet duct assembly 1152, and instead may be provided to other suitable heat sink (see FIG. 23, below). Moreover, in still other exemplary embodiments, the second ACS heat exchanger 1186 may not be in thermal communication with the thermal transfer bus 1134 (see FIG. 24, below).

Figure 23:
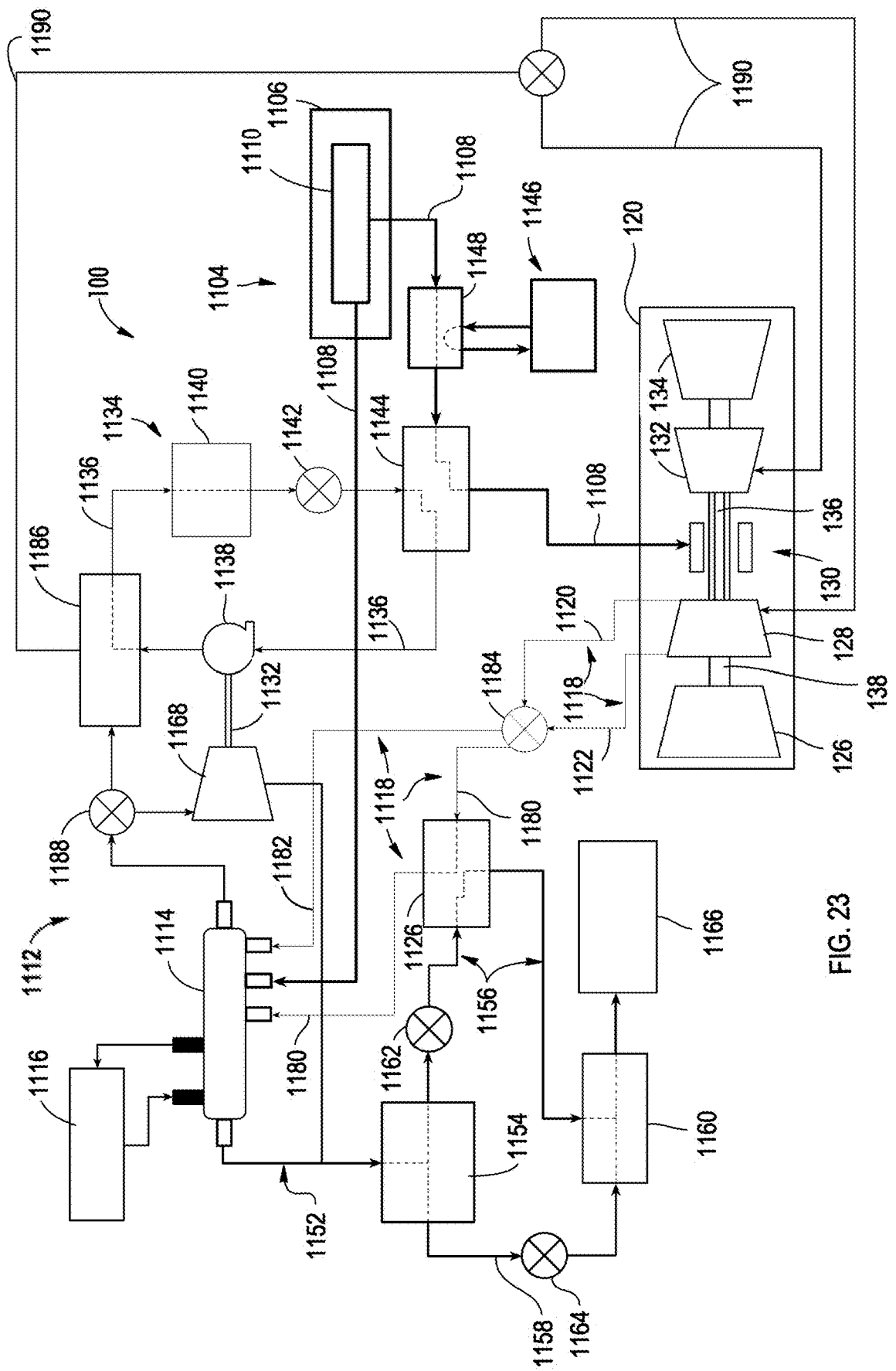
FIG. 23 is a schematic, flow diagram of the gas turbine engine assembly in accordance with yet another exemplary embodiment of the present disclosure.

For example, referring now particularly to FIG. 23, a schematic diagram of another exemplary embodiment of the present disclosure is provided. The exemplary gas turbine engine assembly 100 depicted in FIG. 23 may be configured in substantially the same manner as exemplary gas turbine engine assembly 100 described above with reference to FIGS. 21 and 22. However, for the exemplary embodiment of FIG. 23, airflow provided through the second ACS heat exchanger 1186, cooled by the thermal transfer bus 1134, is not utilized for driving the pump 1138 of the thermal transfer bus 1134. Instead, the cooled airflow from the second ACS heat exchanger 1186 is ducted directly to one or more heat sinks of the turbomachine 120 of the gas turbine engine through one or more ducts 1190. The cooled airflow can be provided to one or more accessories and/or other components mounted under the core cowl 220, for example. Cooling the heat sink(s) can reduce the temperature for components mounted under the core cowl 220, for example.

For the exemplary aspect depicted in FIG. 23, the cooled airflow from the second ACS heat exchanger 1186 is provided directly to a high pressure turbine 132 of the turbomachine 120 of the exemplary gas turbine engine and a high pressure compressor 128 of the turbomachine 120 of the exemplary gas turbine engine. Notably, a portion of an airflow from the second turbine 1176 of the air cycle machine 1114 is additionally utilized to drive the pump 1138 of the thermal transfer bus 1134 for the embodiment of FIG. 23. Specifically, the air cycle assembly 1112 includes a three-way, variable valve 1188 at a location downstream of the second turbine 1176 of the air cycle machine 1114 and upstream of the second ACS heat exchanger 1186 for diverting a flow through a power turbine 1168 of the pump 1138 of the thermal transfer bus 1134 (such that the pump 1138 is configured as a turbopump).

Figure 24:
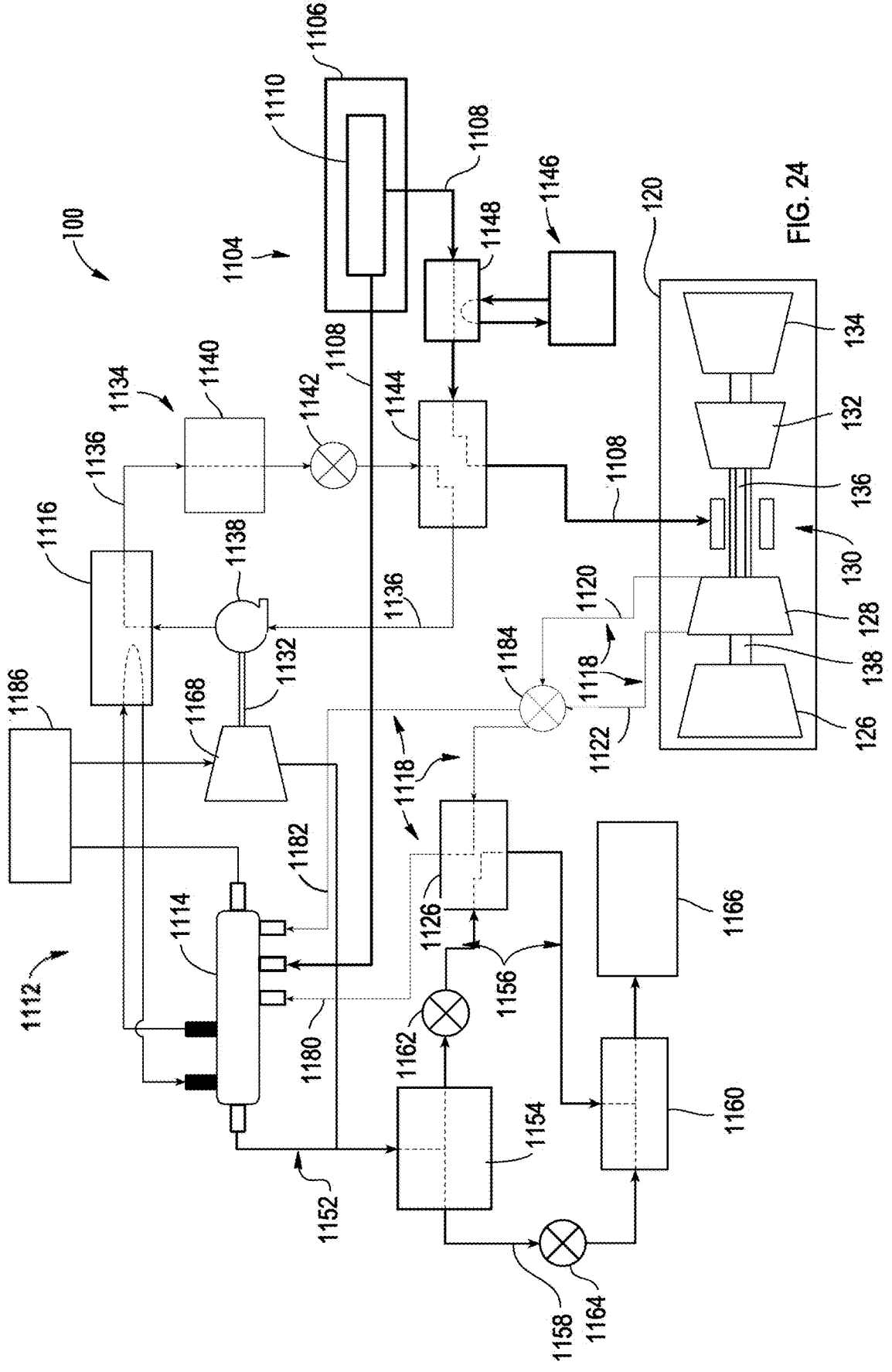
FIG. 24 is a schematic, flow diagram of the gas turbine engine assembly in accordance with still another exemplary embodiment of the present disclosure

Alternatively, by way of example, referring now particularly to FIG. 24, a schematic diagram of yet another exemplary embodiment of the present disclosure is provided. The exemplary gas turbine engine assembly 100 depicted in FIG. 24 may be configured in substantially the same manner as exemplary gas turbine engine assembly 100 described above with reference to FIGS. 21 and 22. However, for the exemplary embodiment of FIG. 24, the second ACS heat exchanger 1186 is not in thermal communication with thermal transfer bus 1134. Instead, for the embodiment of FIG. 24, the second ACS heat exchanger 1186 may be in thermal communication with, e.g., a bypass airflow passage of the gas turbine engine (such as the exemplary bypass airflow passage 72 described above with reference to FIG. 15). In such a manner, the second ACS heat exchanger 1186 may utilize the bypass airflow passage as a heat sink for the air cycle machine 1114. By contrast, the first ACS heat exchanger 1116 is, for the embodiment depicted, thermally coupled to the thermal transfer bus 1134, such that heat may be extracted from the airflow flowing through the first ACS heat exchanger 1116, and then provided to the fuel delivery system 1104 (i.e., through a fuel heat exchanger 1144, as described above). In such a manner, each of the first ACS heat exchanger 1116 and second ACS heat exchanger 1186 may still be operable to remove heat from a respective airflow from the air cycle machine 1114 therethrough.

Inclusion of an air cycle assembly 1112 in accordance with one or more exemplary embodiments of the present disclosure may allow for a more efficient air cycle assembly 1112 and gas turbine engine. More specifically, utilizing an air cycle assembly 1112 configured to exchange heat with a fuel delivery system 1104 of the gas turbine engine assembly 100 through an intermediate thermal transfer bus 1134 may allow for efficiently removing a relatively large amount of heat from an air cycle machine 1114 of the air cycle assembly 1112, cooling accessories and/or other components positioned on or near the turbomachine 120 under the core cowl 220, while simultaneously utilizing such heat to increase a temperature of a fuel flow through the fuel delivery system 1104 to increase an efficiency of a combustion within the turbomachine 120 of the exemplary gas turbine engine assembly 100.

Referring now to FIG. 25, a flow diagram is provided of a method 2200 for operating a gas turbine engine assembly in accordance with an exemplary aspect of the present disclosure. The exemplary method 2200 of FIG. 25 may operate one or more of the exemplary gas turbine engine assemblies 100 described above. Accordingly, the exemplary gas turbine engine assembly operated by the exemplary method 2200 of FIG. 25 may generally include a turbomachine, a fuel delivery system, an air cycle assembly, and a thermal transfer bus.

The exemplary method 2200 generally includes at (2202) providing a bleed airflow from a compressor section of the turbomachine to an air cycle machine of the air cycle assembly. Additionally, the exemplary method 2200 includes at (2204) transferring heat from the bleed airflow through the air cycle machine of the air cycle assembly to the fuel delivery system through the thermal transfer bus to cool the airflow through the air cycle machine of the air cycle assembly. The cooled airflow can help to cool accessories and/or other components mounted under the core cowl 220, for example.

For the exemplary aspect depicted in FIG. 25, transferring heat from the bleed airflow through the air cycle machine of the air cycle assembly to the fuel delivery system through the thermal transfer bus at (2204) includes at (2206) reducing a temperature of the bleed airflow through the air cycle machine using an ACS heat exchanger thermally coupled to the thermal transfer bus by at least about 150 degrees Fahrenheit. For example, reducing the temperature of the bleed airflow through the air cycle machine at (2206) may include reducing the temperature of the bleed airflow through the air cycle machine by at least about 250 degrees Fahrenheit, such as at least about 300 degrees Fahrenheit, such as at least about 350 degrees Fahrenheit, such as up to 1000 degrees Fahrenheit, such as up to 750 degrees Fahrenheit. The cooled airflow can help to cool accessories and/or other components mounted under the core cowl 220. As a result, components, such as a FADEC or other engine controller, pump, power electronics, electric machine, motor (s), actuator(s), valve(s), other heat exchanger, sensor(s), other controller(s), duct(s), valve(s), fire and overheat detection system components, fire extinguisher components, generator(s), etc., can operate under the cowl 220 without overheating.

Also for the exemplary aspect depicted in FIG. 25, transferring heat from the bleed airflow through the air cycle machine of the air cycle assembly to the fuel delivery system through the thermal transfer bus at (2204) further includes at (2208) increasing a temperature of a fuel flow through the fuel delivery system by at least about 200 degrees Fahrenheit. For example, increasing the temperature of the fuel at (2208) may include increasing the temperature of the fuel by at least about 300 degrees Fahrenheit, such as by at least about 375 degrees Fahrenheit, such as by at least about 425 degrees Fahrenheit, such as by at least about 475 degrees Fahrenheit, such as up to about 1,250 degrees Fahrenheit, such as up to about 900 degrees Fahrenheit.

Further, still, for the exemplary aspect depicted in FIG. 25, transferring heat from the bleed airflow through the air cycle machine of the air cycle assembly to the fuel delivery system through the thermal transfer bus to cool the airflow through the air cycle machine of the air cycle assembly at (2204) further includes at (2210) circulating a thermal transfer fluid through one or more conduits of the thermal transfer bus between an ACS heat exchanger thermally coupling the thermal transfer fluid to the bleed airflow and a fuel heat exchanger thermally coupling the thermal transfer fluid to a fuel flow through the fuel delivery system. Although not depicted in FIG. 25, in certain exemplary aspects, circulating the thermal transfer fluid at (2210) may include maintaining the thermal transfer fluid in a consistent state, such as a gas state, a liquid state, or a supercritical state.

Moreover, the exemplary method 2200 depicted in FIG. 25 further includes at (2212) providing the bleed airflow from the air cycle machine to an output assembly of the air cycle assembly at a pressure greater than about 50 pounds per square inch absolute and less than about 600 pounds per square inch absolute. For example, in certain exemplary aspects, the method 2200 may provide the bleed airflow from the air cycle machine to the output assembly of the air cycle assembly at a pressure greater than about 75 pounds per square inch absolute, such as greater than about 100 pounds per square inch absolute, such as less than about 600 pounds per square inch absolute, such as less than about 450 pounds per square inch absolute, such as less than about 300 pounds per square inch absolute.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining an axial direction and a radial direction, the gas turbine engine comprising a turbomachine having an unducted primary fan, a core engine including a combustor and a combustor casing enclosing the combustor and defining an outer surface, and a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), and wherein the CDR is between 2.7 and 3.5 and wherein the CLR is between 0.25 and 0.50.

The gas turbine engine of the preceding clause, wherein the CDR is between 2.8 and 3.3.

The gas turbine engine of any preceding clause, wherein the CLR is between 0.3 and 0.45.

The gas turbine engine of any preceding clause, wherein the CLR is between 0.40 and 0.45.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, further comprising a rear frame including a strut having a trailing edge, wherein the primary fan includes a primary fan blade having a leading edge, and wherein the overall core axial length (L) along the axial direction is measured from the leading edge of the primary fan blade to the trailing edge of the strut.

The gas turbine engine of any preceding clause, further comprising a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft, comprising a wing and a gas turbine engine mounted to the wing, the gas turbine engine defining an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface. Wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction. Wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L). Wherein the CDR is between 2.7 and 3.5 and wherein the CLR is between 0.25 and 0.50.

The aircraft as in the preceding clause, wherein the CDR is between 2.8 and 3.3.

The aircraft of any preceding clause, wherein the CLR is between 0.3 and 0.45.

The aircraft of any preceding clause, wherein the CLR is between 0.40 and 0.45.

The aircraft of any preceding clause, wherein a void is defined between the outer surface of the combustor casing and the inner surface of the core cowl of the gas turbine engine, and wherein at least one engine accessory is coupled to the inner surface of the core cowl.

The aircraft of any preceding clause, wherein the gas turbine engine further comprises a rear frame including a strut having a trailing edge, wherein the primary fan includes a plurality of primary fan blades where each primary fan blade has a leading edge, and wherein the overall core axial length (L) along the axial direction is measured from a leading edge of a respective primary fan blade of the plurality of primary fan blades to the trailing edge of the strut.

The aircraft of any preceding clause, wherein the gas turbine engine further comprises a high-pressure compressor inlet guide vane having a leading edge, and a rear frame including a strut having a trailing edge, wherein the under-core cowl axial length (L1) along the axial direction is measured from the leading edge of the inlet guide vane to the trailing edge of the strut.

The aircraft of any preceding clause, the gas turbine engine further comprising a ducted secondary fan disposed downstream from the unducted primary fan.

A gas turbine engine, comprising: a core engine; a core cowl at least partially encasing a portion of the core engine, the core cowl having an inner surface and defining in part a void is between the inner surface and the core engine, the core cowl moveable relative to the core engine; and an engine component selectively coupled to the core engine or the core cowl.

The gas turbine engine of the preceding clause, wherein the core cowl is pivotable relative to the core engine.

A gas turbine engine, comprising a turbomachine and a housing at least partially encasing a portion of the turbomachine, the housing having an inner surface and defining in part a void between the inner surface and the portion of the turbomachine, the housing moveable relative to the portion of the turbomachine; and an engine component selectively coupled to the portion of the turbomachine or to the housing.

The gas turbine engine of the preceding clause, wherein the turbomachinery comprises a core engine, the housing comprises a core cowl at least partially encasing a portion of the core engine, the core cowl having an inner surface and defining in part a void between the inner surface and the core engine, wherein the core cowl is moveable relative to the core engine, and an engine component selectively coupled to the core engine or the core cowl, and wherein the core cowl is pivotable relative to the core engine.

The gas turbine engine of any preceding clause, wherein when the engine component is selectively coupled to the core cowl, the engine component travels with the core cowl when the core cowl is moved away from the core engine.

The gas turbine engine of any preceding clause, wherein the engine component is one of a heat exchanger, a sensor, a controller, a pump, a duct, a fire and overheat component, a generator, or a valve.

The gas turbine engine of any preceding clause, further comprising: a fastener, wherein the engine component is selectively connected to the core engine or the core cowl via the fastener.

The gas turbine engine of any preceding clause, wherein the core cowl defines an access opening, wherein the fastener is accessible through the access opening.

The gas turbine engine of any preceding clause, wherein the fastener includes a plurality of articulating tabs, wherein in a first position the plurality of articulating tabs engages with the core engine and the engine component and in a second position the plurality of tabs engages with the core cowl and the engine component.

The gas turbine engine of any preceding clause, further comprising a push-pull mechanism including a first pin, wherein the engine component is selectively coupled to the core engine or the core cowl via the push-pull mechanism, wherein the first pin engages with the core engine and the engine component when the push-pull mechanism is in a first position, and the first pin engages with the engine component and the core cowl when the push-pull mechanism is in a second position.

The gas turbine engine of any preceding clause, wherein the push-pull mechanism is manually actuated between the first position and the second position.

The gas turbine engine of any preceding clause, wherein the push-pull mechanism is electrically actuated between the first position and the second position.

The gas turbine engine of any preceding clause, wherein the push-pull mechanism includes a second pin, wherein the second pin engages with a door counterbalance mechanism when the first pin is engaged with the engine component and the core cowl.

The gas turbine engine of any preceding clause, wherein the gas turbine engine includes an unducted primary fan.

The gas turbine engine of any preceding clause, further comprising a ducted secondary fan disposed downstream from the primary fan, wherein the ducted secondary fan is a single stage secondary fan or a multi-stage secondary fan.

An aircraft, comprising a core engine and a core cowl at least partially encasing a portion of the core engine. The core cowl having an inner surface, wherein a void is defined between the inner surface and the core engine, wherein the core cowl is pivotally mounted to the gas turbine engine, and an engine component selectively coupled to the core engine or the core cowl.

The aircraft as in the preceding clause, wherein the engine component is selectively coupled to the core cowl, and wherein the engine component travels with the core cowl when the core cowl is pivoted away from the core engine.

The aircraft of any preceding clause, wherein the engine component is one of a heat exchanger, a sensor, a controller, a pump, a duct, a fire and overheat component, a generator, or a valve.

The aircraft of any preceding clause, wherein the engine component is selectively coupled to the core engine or the core cowl via a fastener, wherein the fastener is accessible from outside of the core cowl, wherein the fastener includes a plurality of articulating tabs, and wherein in a first position the plurality of articulating tabs engages with the core engine and the engine component, and in a second position the plurality of articulating tabs engages with the core cowl and the engine component.

The aircraft of any preceding clause, wherein the engine component is selectively coupled to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position.

The aircraft of any preceding clause, wherein the push-pull mechanism is manually actuated between the first position and the second position.

The aircraft of any preceding clause, wherein the push-pull mechanism includes a second pin, wherein the second pin engages with a door counterbalance mechanism when the first pin is engaged with the core cowl and the engine component.

The aircraft of any preceding clause, wherein the engine component is selectively connected to the core engine or the core cowl via a push-pull mechanism including a first pin, wherein the first pin engages with the core engine and the engine component when the push-pull mechanism is in a first position, and the first pin engages with the engine component and the core cowl when the push-pull mechanism is in a second position, wherein the push-pull mechanism is manually actuatable between the first position and the second position.

The aircraft of any preceding clause, wherein the gas turbine engine includes a ducted primary fan.

The gas turbine engine of any preceding clause, wherein the engine component is positioned within the core cowl.

The gas turbine engine of any preceding clause, wherein the engine component is one of a heat exchanger, a sensor, a controller, a pump, a duct, a fire and overheat component, a generator, or a valve.

The gas turbine engine of any preceding clause, wherein the engine component is an engine controller.

The gas turbine engine of any preceding clause, wherein the engine component is power electronics, a lubrication oil tank, a lubrication oil pump, an electric machine, or a combination thereof.

The gas turbine engine of any preceding clause, wherein the gas turbine engine is incorporated into an aircraft configured to cruise at an altitude between 28,000 feet and 65,000 feet.

The gas turbine engine of any preceding clause, wherein the gas turbine engine is configured to generate at least 18,000 pounds of thrust and less than 80,000 pounds of thrust when operated at a rated speed during standard day operating conditions.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox, the primary fan being drivingly coupled to the core engine across the gearbox; wherein the gas turbine engine is configured to generate at least 18,000 pounds of thrust and less than 80,000 pounds of thrust when operated at a rated speed during standard day operating conditions, wherein the turbomachine defines an initial compression length ratio (ICLR) equal to the initial compression axial length (L2) divided by the under-core cowl axial length (L1), wherein the ICLR is greater than or equal to 0.55 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox and a turbine section having a low-pressure turbine, the primary fan being drivingly coupled to the low-pressure turbine across the gearbox; wherein the low-pressure turbine comprises at least a total of four stages of low-pressure turbine rotor blades and up to six stages of low-pressure turbine rotor blades; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the turbomachine defining an under-core cowl axial length (L1) along the axial direction and an initial compression axial length (L2), the core engine comprising a gearbox having a gear ratio greater than or equal to 3.2:1 and less than or equal to 14:1, the primary fan being drivingly coupled to the core engine across the gearbox; wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

A gas turbine engine defining an axial direction, the gas turbine engine comprising: a turbomachine having a primary fan, a core engine, and a core cowl surrounding at least a portion of the core engine, the core engine comprising a high-pressure compressor comprising at least a total of eight stages of high-pressure compressor rotor blades and up to a total of 11 stages of high-pressure compressor rotor blades, the core engine further comprising a gearbox, the primary fan being drivingly coupled to the core engine across the gearbox; wherein the turbomachine defines an under-core cowl axial length (L1) along the axial direction and an initial compression axial length (L2), wherein the turbomachine defines an initial compression length ratio (ICLR) equal to the initial compression axial length (L2) divided by the under-core cowl axial length (L1), wherein the ICLR is greater than or equal to 0.3 and less than or equal to 0.9.

The gas turbine engine of any preceding clause, wherein the ICLR is greater than or equal to 0.55 and less than or equal to 0.9.

The gas turbine engine of any preceding clause, wherein the ICLR is greater than or equal to 0.6 and less than or equal to 0.89.

The gas turbine engine of any preceding clause, wherein the primary fan is an unducted primary fan, and wherein the ICLR is greater than or equal to 0.7.

The gas turbine engine of any preceding clause, wherein the turbomachine further includes a fan cowl and defines a fan duct between the fan cowl and the core cowl configured as a third stream, and wherein the ICLR is greater than or equal to 0.7.

The gas turbine engine of any preceding clause, further comprising a nacelle surrounding at least in part the primary fan, and wherein the ICLR is greater than or equal to 0.6 and less than or equal to 0.75.

The gas turbine engine of any preceding clause, wherein the gas turbine engine is a two stream engine, and wherein the ICLR is greater than or equal to 0.6 and less than or equal to 0.75.

The gas turbine engine of any preceding clause, wherein the core engine comprises a compressor section and a turbine section, wherein the compressor section has a high-pressure compressor comprising a total of eight to ten stages of high-pressure compressor rotor blades, and wherein the turbine section has a low-pressure turbine comprising a total of three to five stages of low-pressure turbine rotor blades.

The gas turbine engine of any preceding clause, wherein the gas turbine engine is configured to generate at least 18,000 pounds of thrust and less than 80,000 pounds of thrust when operated at a rated speed during standard day operating conditions.

The gas turbine engine of any preceding clause, wherein the gas turbine engine is configured to generate between 25,000 and 60,000 pounds of thrust during operation at the rated speed during standard day operating conditions.

The gas turbine engine of any preceding clause, wherein the high-pressure compressor comprises a total of nine stages.

The gas turbine engine of any preceding clause, wherein the low-pressure turbine comprises a total of four stages.

A gas turbine engine defining an axial direction and a radial direction, the gas turbine engine comprising: a turbomachine having an unducted primary fan, a core engine including a compressor, a combustor, and a combustor casing enclosing the combustor and defining an outer surface, a core cowl surrounding at least a portion of the core engine and defining an inner surface and an outer surface; a fuel delivery system operable with the combustor to provide fuel to the combustor; an air cycle assembly comprising an air cycle machine and a heat exchanger, the air cycle machine in airflow communication with the compressor and the heat exchanger; and a thermal transfer bus thermally coupling the heat exchanger of the air cycle assembly to the fuel delivery system to transfer heat from the air cycle machine to the fuel delivery system, wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The gas turbine engine of any preceding clause, wherein a void is defined between the outer surface of the combustor casing and the inner surface of the core cowl.

The gas turbine engine of any preceding clause, further comprising at least one engine accessory coupled to the inner surface of the core cowl.

The gas turbine engine of any preceding clause, wherein the thermal transfer bus comprises a thermal energy storage unit.

The gas turbine engine of any preceding clause, wherein the heat exchanger of the air cycle assembly is an ACS heat exchanger, wherein the thermal transfer bus comprises a fuel heat exchanger for transferring heat to the fuel delivery system, and wherein the fuel delivery system comprises a fuel cooled oil cooler at a location upstream of the fuel heat exchanger.

The gas turbine engine of any preceding clause, wherein the air cycle assembly comprises a thermal energy storage unit at a location downstream of the air cycle machine.

The gas turbine engine of any preceding clause, wherein the thermal transfer bus comprises a pump, and wherein the pump is mechanically driven by the air cycle machine.

The gas turbine engine of any preceding clause, wherein the thermal transfer bus comprises a turbopump, wherein the turbopump comprises a power turbine in airflow communication with the compressor at a location upstream of the air cycle machine.

The gas turbine engine of any preceding clause, wherein the compressor of the turbomachine is a first compressor, and wherein the air cycle machine comprises a second compressor for receiving and compressing a bleed airflow from the first compressor and a turbine rotatable with the second compressor and positioned downstream of the second compressor, the turbine of the air cycle machine configured to expand and cool the compressed bleed airflow from the second compressor.

The gas turbine engine of any preceding clause, wherein the heat exchanger is in airflow communication with the second compressor of the air cycle machine at a location downstream of the second compressor of the air cycle machine and the turbine of the air cycle machine at a location upstream of the turbine of the air cycle machine.

The gas turbine engine of any preceding clause, wherein the turbine of the air cycle machine is a first turbine, wherein the air cycle machine further comprises a second turbine and a second combustor, wherein the second combustor is located upstream of the second turbine, and wherein the second turbine is rotatable with the second compressor of the air cycle machine.

The gas turbine engine of any preceding clause, wherein the heat exchanger is in airflow communication with the second turbine of the air cycle machine at a location downstream of the second turbine of the air cycle machine.

The gas turbine engine of any preceding clause, wherein the heat exchanger of the air cycle assembly is a first ACS heat exchanger, wherein the air cycle assembly further comprises a second ACS heat exchanger, wherein the first ACS heat exchanger is positioned downstream of the second compressor of the air cycle machine and upstream of the first turbine of the air cycle machine.

The gas turbine engine of any preceding clause, wherein the second ACS heat exchanger is in thermal communication with a bypass airflow passage of the gas turbine engine.

The gas turbine engine of any preceding clause, wherein the heat exchanger of the air cycle assembly is a second ACS heat exchanger, wherein the air cycle assembly further comprises a first ACS heat exchanger, wherein the first ACS heat exchanger is positioned downstream of the second compressor of the air cycle machine and upstream of the first turbine of the air cycle machine, wherein the second ACS heat exchanger is positioned downstream of the second turbine, and wherein the second ACS heat exchanger is in thermal communication with a bypass airflow passage of the gas turbine engine.

The gas turbine engine of any preceding clause, wherein the thermal transfer bus comprises a turbopump, wherein the turbopump comprises a power turbine in airflow communication with the air cycle machine at a location downstream of the second turbine of the air cycle machine.

The gas turbine engine of any preceding clause, wherein the thermal transfer bus utilizes a single phase heat transfer fluid during operation.

The gas turbine engine of any preceding clause, further comprising a ducted secondary fan disposed downstream from the primary fan.

The gas turbine engine of any preceding clause, wherein the ducted secondary fan is a single stage secondary fan.

The gas turbine engine of any preceding clause, wherein the gas turbine engine is a three-stream gas turbine engine.

An aircraft including a wing and the gas turbine engine of any preceding clause.

A gas turbine engine including a fuel delivery system operable with a combustor to provide fuel to the combustor; an air cycle assembly comprising an air cycle machine and a heat exchanger, the air cycle machine in airflow communication with a compressor and the heat exchanger; and a thermal transfer bus thermally coupling the heat exchanger of the air cycle assembly to the fuel delivery system to transfer heat from the air cycle machine to the fuel delivery system.

A gas turbine engine including: a turbomachine having an unducted primary fan, a core engine including a compressor, a combustor, and a combustor casing enclosing the combustor and defining an outer surface, a core cowl surrounding at least a portion of the core engine and defining an inner surface and an outer surface; and an air cycle assembly comprising an air cycle machine and a heat exchanger, the air cycle machine in airflow communication with the compressor and the heat exchanger for heat transfer.

A gas turbine engine assembly including: a turbomachine including a compressor section, a combustion section, and a turbine section in serial flow order; a fuel delivery system operable with the combustion section of the turbomachine for providing fuel to the combustion section of the turbomachine; and an air cycle assembly comprising an air cycle machine and a heat exchanger, the air cycle machine in airflow communication with the compressor section of the turbomachine and the heat exchanger in airflow communication with the air cycle machine, wherein the air cycle machine includes a compressor for receiving and compressing a bleed airflow from the compressor section of the turbomachine and a turbine rotatable with the compressor and positioned downstream of the compressor, the turbine of the air cycle machine configured to expand and cool the compressed bleed airflow from the compressor, wherein the turbine of the air cycle machine is a first turbine, wherein the air cycle machine further comprises a second turbine and a combustor, wherein the combustor is located upstream of the second turbine, wherein the second turbine is rotatable with the compressor of the air cycle machine, and wherein the heat exchanger is in airflow communication with the second turbine of the air cycle machine at a location downstream of the second turbine of the air cycle machine.

An aircraft including the gas turbine engine of any preceding clause.

A method of operating a gas turbine engine or aircraft of any preceding clause.

A method of operating an air cycle assembly on a gas turbine engine, the method including: providing a bleed airflow from a compressor section of the turbomachine to an air cycle machine of an air cycle assembly; transferring heat from the bleed airflow through the air cycle machine of the air cycle assembly to the fuel delivery system through the thermal transfer bus to cool the airflow through the air cycle machine of the air cycle assembly; and providing the bleed airflow from the air cycle machine to an output assembly of the air cycle assembly.

The method of any preceding clause, wherein transferring heat from the bleed airflow through the air cycle machine of the air cycle assembly to the fuel delivery system through the thermal transfer bus includes reducing a temperature of the bleed airflow through the air cycle machine using an ACS heat exchanger thermally coupled to the thermal transfer bus by at least about 150 degrees Fahrenheit.

The method of any preceding clause, wherein transferring heat from the bleed airflow through the air cycle machine of the air cycle assembly to the fuel delivery system through the thermal transfer bus further includes increasing a temperature of a fuel flow through the fuel delivery system by at least about 200 degrees Fahrenheit.

The method of any preceding clause, wherein transferring heat from the bleed airflow through the air cycle machine of the air cycle assembly to the fuel delivery system through the thermal transfer bus to cool the airflow through the air cycle machine of the air cycle assembly further includes circulating a thermal transfer fluid through one or more conduits of the thermal transfer bus between an ACS heat exchanger thermally coupling the thermal transfer fluid to the bleed airflow and a fuel heat exchanger thermally coupling the thermal transfer fluid to a fuel flow through the fuel delivery system.

The method of any preceding clause, wherein providing bleed airflow includes providing the bleed airflow from the air cycle machine to the output assembly of the air cycle assembly at a pressure greater than about 75 pounds per square inch absolute, such as greater than about 100 pounds per square inch absolute, such as less than about 600 pounds per square inch absolute, such as less than about 450 pounds per square inch absolute, such as less than about 300 pounds per square inch absolute.

The method of any preceding clause, wherein the gas turbine engine defines an axial direction and a radial direction, the gas turbine engine comprising: a turbomachine having an unducted primary fan, a core engine including a combustor and a combustor casing enclosing the combustor and defining an outer surface, a core cowl surrounding at least a portion of the core engine and defining an inner surface and an outer surface, the core engine including a compressor section upstream of the combustor; wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction, wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L), wherein the CDR is between 2.7 and 3.5 and wherein the CLR is between 0.25 and 0.50.

The method of any preceding clause, wherein the gas turbine engine includes a fuel delivery system operable with a combustor to provide fuel to the combustor; an air cycle assembly comprising an air cycle machine and a heat exchanger, the air cycle machine in airflow communication with a compressor and the heat exchanger; and a thermal transfer bus thermally coupling the heat exchanger of the air cycle assembly to the fuel delivery system to transfer heat from the air cycle machine to the fuel delivery system.

The method of any preceding clause, wherein the gas turbine engine is the gas turbine engine of any preceding clause.

We claim:

1. A gas turbine engine defining an axial direction and a radial direction, the gas turbine engine comprising:
   a turbomachine having an unducted primary fan, a core engine including a compressor, a combustor, and a combustor casing enclosing the combustor and defining an outer surface, a core cowl surrounding at least a portion of the core engine and defining an inner surface and an outer surface;
   a fuel delivery system operable with the combustor to provide fuel to the combustor;
   an air cycle assembly comprising an air cycle machine and a heat exchanger, the air cycle machine in airflow communication with the compressor and the heat exchanger; and
   a thermal transfer bus thermally coupling the heat exchanger of the air cycle assembly to the fuel delivery system to transfer heat from the air cycle machine to the fuel delivery system,
   wherein the outer surface of the core cowl defines a peak cowl diameter (D) in the radial direction, the outer surface of the combustor casing defines a maximum combustor casing diameter (d) along the radial direction, the core engine defines an overall core axial length (L) along the axial direction and an under-core cowl axial length (L1) along the axial direction,
   wherein the gas turbine engine defines a core cowl diameter ratio (CDR) equal to the peak cowl diameter (D) divided by the maximum combustor casing diameter (d) and a core cowl length ratio (CLR) equal to the under-core cowl axial length (L1) divided by the overall core axial length (L),
   wherein the CDR is between 2.7 and 3.5 and wherein the CLR is between 0.25 and 0.50.

2. The gas turbine engine of claim 1, wherein a void is defined between the outer surface of the combustor casing and the inner surface of the core cowl.

3. The gas turbine engine of claim 2, further comprising at least one engine accessory coupled to the inner surface of the core cowl.

4. The gas turbine engine of claim 1, wherein the thermal transfer bus comprises a thermal energy storage unit.

5. The gas turbine engine of claim 1, wherein the heat exchanger of the air cycle assembly is an ACS heat exchanger, wherein the thermal transfer bus comprises a fuel heat exchanger for transferring heat to the fuel delivery system, and wherein the fuel delivery system comprises a fuel cooled oil cooler at a location upstream of the fuel heat exchanger.

6. The gas turbine engine of claim 1, wherein the air cycle assembly comprises a thermal energy storage unit at a location downstream of the air cycle machine.

7. The gas turbine engine of claim 1, wherein the thermal transfer bus comprises a pump, and wherein the pump is mechanically driven by the air cycle machine.

8. The gas turbine engine of claim 1, wherein the thermal transfer bus comprises a turbopump, wherein the turbopump comprises a power turbine in airflow communication with the compressor at a location upstream of the air cycle machine.

9. The gas turbine engine of claim 1, wherein the compressor of the turbomachine is a first compressor, and wherein the air cycle machine comprises a second compressor for receiving and compressing a bleed airflow from the first compressor and a turbine rotatable with the second compressor and positioned downstream of the second compressor, the turbine of the air cycle machine configured to expand and cool the compressed bleed airflow from the second compressor.

10. The gas turbine engine of claim 9, wherein the heat exchanger is in airflow communication with the second compressor of the air cycle machine at a location downstream of the second compressor of the air cycle machine and the turbine of the air cycle machine at a location upstream of the turbine of the air cycle machine.

11. The gas turbine engine of claim 9, wherein the turbine of the air cycle machine is a first turbine, wherein the air cycle machine further comprises a second turbine and a second combustor, wherein the second combustor is located upstream of the second turbine, and wherein the second turbine is rotatable with the second compressor of the air cycle machine.

12. The gas turbine engine of claim 11, wherein the heat exchanger is in airflow communication with the second turbine of the air cycle machine at a location downstream of the second turbine of the air cycle machine.

13. The gas turbine engine of claim 11, wherein the heat exchanger of the air cycle assembly is a first ACS heat exchanger, wherein the air cycle assembly further comprises a second ACS heat exchanger, wherein the first ACS heat exchanger is positioned downstream of the second compressor of the air cycle machine and upstream of the first turbine of the air cycle machine.

14. The gas turbine engine of claim 13, wherein the second ACS heat exchanger is in thermal communication with a bypass airflow passage of the gas turbine engine.

15. The gas turbine engine of claim 13, wherein the heat exchanger of the air cycle assembly is a second ACS heat exchanger, wherein the air cycle assembly further comprises a first ACS heat exchanger, wherein the first ACS heat exchanger is positioned downstream of the second compressor of the air cycle machine and upstream of the first turbine of the air cycle machine, wherein the second ACS heat exchanger is positioned downstream of the second turbine, and wherein the second ACS heat exchanger is in thermal communication with a bypass airflow passage of the gas turbine engine.

16. The gas turbine engine of claim 11, wherein the thermal transfer bus comprises a turbopump, wherein the turbopump comprises a power turbine in airflow communication with the air cycle machine at a location downstream of the second turbine of the air cycle machine.

17. The gas turbine engine of claim 1, wherein the thermal transfer bus utilizes a single phase heat transfer fluid during operation.

18. The gas turbine engine of claim 1, further comprising a ducted secondary fan disposed downstream from the primary fan.

19. The gas turbine engine of claim 18, wherein the ducted secondary fan is a single stage secondary fan.

20. The gas turbine engine of claim 18, wherein the gas turbine engine is a three-stream gas turbine engine.

\*   \*   \*   \*   \*